(12) United States Patent
Tazaki et al.

(10) Patent No.: US 10,906,278 B2
(45) Date of Patent: Feb. 2, 2021

(54) MULTILAYERED TUBE FOR TRANSPORTING LIQUID MEDICINE AND POLYAMIDE RESIN COMPOSITION

(71) Applicant: KURARAY CO., LTD., Kurashiki (JP)

(72) Inventors: Go Tazaki; Toshiaki Hasegawa, Tsukuba (JP)

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 15/538,363

(22) PCT Filed: Dec. 22, 2015

(86) PCT No.: PCT/JP2015/085874
§ 371 (c)(1),
(2) Date: Jun. 21, 2017

(87) PCT Pub. No.: WO2016/104531
PCT Pub. Date: Jun. 30, 2016

(65) Prior Publication Data
US 2017/0368805 A1    Dec. 28, 2017

(30) Foreign Application Priority Data
Dec. 24, 2014 (JP) .................. 2014-260631

(51) Int. Cl.
*B32B 1/08* (2006.01)
*B32B 27/18* (2006.01)
(Continued)

(52) U.S. Cl.
CPC ................ *B32B 27/18* (2013.01); *B32B 1/08* (2013.01); *B32B 3/30* (2013.01); *B32B 7/12* (2013.01);
(Continued)

(58) Field of Classification Search
CPC ... B32B 1/08; B32B 2250/02; B32B 2250/03; B32B 2250/04; B32B 2250/05;
(Continued)

(56) References Cited

U.S. PATENT DOCUMENTS

2002/0099136 A1* 7/2002 Park ..................... C08K 5/3412
525/66
2005/0131147 A1    6/2005 Brule
(Continued)

FOREIGN PATENT DOCUMENTS

CA    2 861 532 A1 †  1/2013
EP    2 476 938 A1 †  7/2012
(Continued)

OTHER PUBLICATIONS

Communication pursuant to Rule 114(2) EPC dated Apr. 17, 2018 in European Patent Application No. 15873099.4.
(Continued)

*Primary Examiner* — Lee E Sanderson
(74) *Attorney, Agent, or Firm* — Oblon, McClelland, Maier & Neustadt, L.L.P.

(57) ABSTRACT

There is provided a multilayered tube for transporting liquid chemicals containing an outermost layer and an innermost layer, the innermost layer containing a polyamide (A), an impact modifier (B), and a carbon nanotube (C), wherein the number of projections each having a height of 5 μm or more and a longitudinal width of 20 μm or more, which are present on the surface of the innermost layer, is 2 or less per 1 $mm^2$ of surface area; and the number of agglomerates each having a longitudinal width of 5 μm or more, which are present in the cross section of the innermost layer, is 15 or less per 1 $mm^2$ of cross-sectional area. There is also provided a polyamide resin composition constituting the innermost layer of the multilayered tube for transporting liquid chemicals.

20 Claims, 4 Drawing Sheets

(51) Int. Cl.

| | | |
|---|---|---|
| C08L 77/06 | (2006.01) | |
| F16L 9/12 | (2006.01) | |
| B32B 27/32 | (2006.01) | |
| F16L 11/127 | (2006.01) | |
| F16L 11/04 | (2006.01) | |
| C08K 3/04 | (2006.01) | |
| C08G 69/26 | (2006.01) | |
| C08L 51/06 | (2006.01) | |
| B32B 27/20 | (2006.01) | |
| B32B 27/30 | (2006.01) | |
| B32B 3/30 | (2006.01) | |
| B32B 27/08 | (2006.01) | |
| B32B 7/12 | (2006.01) | |
| B32B 27/22 | (2006.01) | |
| B32B 27/36 | (2006.01) | |
| B32B 27/34 | (2006.01) | |

(52) U.S. Cl.
CPC .............. *B32B 27/08* (2013.01); *B32B 27/20* (2013.01); *B32B 27/22* (2013.01); *B32B 27/302* (2013.01); *B32B 27/306* (2013.01); *B32B 27/308* (2013.01); *B32B 27/32* (2013.01); *B32B 27/322* (2013.01); *B32B 27/34* (2013.01); *B32B 27/36* (2013.01); *C08G 69/265* (2013.01); *C08K 3/041* (2017.05); *C08L 51/06* (2013.01); *C08L 77/06* (2013.01); *F16L 9/123* (2013.01); *F16L 11/045* (2013.01); *F16L 11/127* (2013.01); *B32B 2250/02* (2013.01); *B32B 2250/03* (2013.01); *B32B 2250/04* (2013.01); *B32B 2250/05* (2013.01); *B32B 2250/24* (2013.01); *B32B 2264/108* (2013.01); *B32B 2270/00* (2013.01); *B32B 2307/202* (2013.01); *B32B 2307/21* (2013.01); *B32B 2307/306* (2013.01); *B32B 2307/538* (2013.01); *B32B 2307/54* (2013.01); *B32B 2307/558* (2013.01); *B32B 2307/714* (2013.01); *B32B 2307/7265* (2013.01); *B32B 2597/00* (2013.01); *C08L 2201/04* (2013.01); *C08L 2203/18* (2013.01)

(58) Field of Classification Search
CPC .......... F16L 11/04; F16L 11/12; F16L 11/127; F16L 9/125; C08K 2201/011; C08J 3/226; C08L 77/00; C08L 77/02; C08L 77/04; C08L 77/06; C08L 77/08; C08L 77/10; C08L 77/12

USPC ................................ 428/36.9, 36.91, 36.92
See application file for complete search history.

(56) References Cited

U.S. PATENT DOCUMENTS

| | | | |
|---|---|---|---|
| 2010/0009107 A1* | 1/2010 | Defilippi | B32B 1/08 428/36.91 |
| 2010/0112256 A1 | 5/2010 | Bonnet et al. | |
| 2011/0160374 A1 | 6/2011 | Jin et al. | |
| 2012/0168020 A1 | 7/2012 | Nakamura et al. | |
| 2012/0298925 A1* | 11/2012 | Kim | C08L 101/12 252/503 |
| 2013/0295308 A1* | 11/2013 | Kumazawa | C08L 77/06 428/36.9 |
| 2014/0361227 A1* | 12/2014 | Asakawa | H01B 1/24 252/511 |
| 2015/0101728 A1* | 4/2015 | Fudemoto | B60C 5/01 152/537 |

FOREIGN PATENT DOCUMENTS

| | | | | |
|---|---|---|---|---|
| EP | 2 666 823 A1 | † | 11/2013 | |
| JP | 10-292106 | † | 11/1998 | |
| JP | 10-292106 A | | 11/1998 | |
| JP | 2004-250707 A | | 9/2004 | |
| JP | 2008-179753 A | | 8/2008 | |
| JP | 2008-261374 A | | 10/2008 | |
| JP | 2010-162788 A | | 7/2010 | |
| JP | 2013201117 A | * | 10/2013 | ............... H01B 1/24 |
| WO | 2005/102694 A1 | | 11/2005 | |
| WO | WO 2006/041186 A1 | | 4/2006 | |
| WO | WO 2011/027863 A1 | | 3/2011 | |
| WO | 2012/098840 A1 | | 7/2012 | |
| WO | 2013/125280 A1 | | 8/2013 | |

OTHER PUBLICATIONS

International Search Report dated Mar. 15, 2016, in PCT/JP2015/085874, filed Dec. 22, 2015.
Japanese Office Action dated Sep. 4, 2018 in Patent Application No. 2016-566405, 31 pages.
"NC7000™ Multiwall Carbon Nanotubes" Nanocyl SA, vol. 8, Jul. 12, 2016, 4 Pages.
"Examples of Mechanical and Structural Application", 2020, 7 pages (with Partial English Translation) https://jp.mitsuichemicals.com/jp/service/mobility/compound/arlen/index.htm.

\* cited by examiner
† cited by third party (a)

(b)

(a)

(b)

(a)

(b)

MULTILAYERED TUBE FOR TRANSPORTING LIQUID MEDICINE AND POLYAMIDE RESIN COMPOSITION

TECHNICAL FIELD

The present invention relates to a multilayered tube for transporting liquid chemicals and to a polyamide resin composition. More specifically, the present invention relates to a multilayered tube for transporting liquid chemicals, containing an innermost layer which is excellent in conductivity, liquid chemical barrier properties, and impact resistance, hardly generates a crack even when inserted into other members, and is excellent in elongation properties and to a polyamide resin composition for constituting the innermost layer of the multilayered tube for transporting liquid chemicals.

BACKGROUND ART

Although resin is generally an electrically insulating material, conductivity is often required of resin in applications such as a member for electric and electronic components and a member for automobile parts. Examples of the member for automobile parts include fuel piping and a fuel tank. Since these members generate static electricity by friction when conveying fuel, it is preferred to impart conductivity to these members in order to remove the static electricity.

In recent years, high heat resistance, high impact resistance at ordinary temperature and low temperature, high fuel barrier properties, and satisfactory moldability, in addition to conductivity, have been required for constituent members such as fuel piping and a fuel tank of motor vehicles.

Addition of a conductive filler such as carbon black, graphite, and a carbon nanotube to resin is the most common as a means to impart conductivity to the resin. Since polyamide resin is excellent in various properties such as heat resistance, it is used for fuel piping and a fuel tank of motor vehicles. For example, PTLs 1 to 5 disclose a resin composition containing polyamide resin and a conductive filler mixed therewith, a molded article thereof, or a laminate composed of a layer containing the resin composition.

PTLs 2 to 5 disclose using a carbon nanotube as a conductive filler. With respect to the production of a resin composition including a carbon nanotube, PTL 6 discloses a method for producing a conductive resin composition which contains a carbon nanotube and a thermoplastic resin, has high conductivity even when containing only a small amount of the carbon nanotube, maintains the original physical properties of the thermoplastic resin, and is excellent also in processability such as moldability.

CITATION LIST

Patent Literature

PTL 1: JP 08-261374 A
PTL 2: JP 2004-250707 A
PTL 3: WO 2005-102694 A
PTL 4: JP 2008-179753 A
PTL 5: WO 2012-098840 A
PTL 6: WO 2013-125280 A

SUMMARY OF INVENTION

Technical Problem

In a tube for transporting liquid chemicals including fuel, it is particularly important that, in terms of safety, the innermost layer is excellent in conductivity, liquid chemical barrier properties, and impact resistance, hardly generates a crack also when inserted into other members, and is excellent in elongation properties.

In view of the above circumstances, an object of the present invention is to provide a multilayered tube for transporting liquid chemicals excellent in the above properties and a polyamide resin composition constituting the innermost layer of the multilayered tube for transporting liquid chemicals.

Solution to Problem

The present inventors have found that the above object can be achieved when the innermost layer of the multilayered tube for transporting liquid chemicals is constituted by a specific resin composition with predetermined conditions of the surface and the cross section of the innermost layer satisfied.

Specifically, the present invention relates to the following [1] to [8].

[1] A multilayered tube for transporting liquid chemicals, containing an outermost layer and an innermost layer, the innermost layer containing a polyamide (A), an impact modifier (B), and a carbon nanotube (C), wherein the number of projections each having a height of 5 μm or more and a longitudinal width of 20 μm or more, which are present on the surface of the innermost layer, is 2 or less per 1 $mm^2$ of surface area; and the number of agglomerates each having a longitudinal width of 5 μm or more, which are present in the cross section of the innermost layer, is 15 or less per 1 $mm^2$ of cross-sectional area.

[2] The multilayered tube for transporting liquid chemicals according to the above [1], wherein the polyamide (A) contains a dicarboxylic acid unit and a diamine unit, the dicarboxylic acid unit containing 50 to 100 mol % of a terephthalic acid unit and/or a naphthalene dicarboxylic acid unit, and the diamine unit containing 60 to 100 mol % of an aliphatic diamine unit having 4 to 18 carbon atoms.

[3] The multilayered tube for transporting liquid chemicals according to the above [1] or [2], wherein the impact modifier (B) is a polymer obtained by modifying at least one polymer with an unsaturated compound having a carboxyl group and/or an acid anhydride group, the at least one polymer being selected from the group consisting of an α-olefin copolymer, an (ethylene and/or propylene)/(α,β-unsaturated carboxylic acid and/or unsaturated carboxylate) copolymer, an ionomer, and an aromatic vinyl compound/conjugated diene compound-based block copolymer.

[4] The multilayered tube for transporting liquid chemicals according to any one of the above [1] to [3], wherein the carbon nanotube (C) has a diameter of 0.5 to 100 nm and an aspect ratio of 5 or more.

[5] The multilayered tube for transporting liquid chemicals according to any one of the above [1] to [4], wherein the innermost layer contains 40 to 96.5 parts by mass of the polyamide (A), 3 to 30 parts by mass of the impact modifier (B), and 0.5 to 30 parts by mass of the carbon nanotube (C), based on 100 parts by mass of the total of the polyamide (A), the impact modifier (B), and the carbon nanotube (C).

[6] The multilayered tube for transporting liquid chemicals according to any one of the above [1] to [5], wherein the outermost layer is constituted by at least one material selected from the group consisting of a polyolefin resin and a polyamide resin.

[7] The multilayered tube for transporting liquid chemicals according to any one of the above [1] to [6], wherein the multilayered tube for transporting liquid chemicals contains at least one intermediate layer between the outermost layer and the innermost layer, and the intermediate layer is an intermediate barrier layer constituted by at least one material selected from the group consisting of a saponified ethylene-vinyl acetate copolymer, fluororesin, semi-aromatic polyamide, and aliphatic polyamide.

[8] A polyamide resin composition constituting the innermost layer of the multilayered tube for transporting liquid chemicals according to any one of the above [1] to [7], wherein the number of agglomerates each having a longitudinal width of 5 μm or more is 10 or less per 1 mm$^2$.

Advantageous Effects of Invention

The present invention can provide a multilayered tube for transporting liquid chemicals which is excellent in conductivity, liquid chemical barrier properties, and impact resistance, hardly generates a crack even when inserted into other members, and is excellent in elongation properties; and a polyamide resin composition constituting the innermost layer of the multilayered tube for transporting liquid chemicals. The multilayered tube for transporting liquid chemicals is particularly suitable as fuel piping for motor vehicles and the like.

DESCRIPTION OF EMBODIMENTS

[Multilayered Tube for Transporting Liquid Chemicals]

The multilayered tube for transporting liquid chemicals according to the present invention contains an outermost layer and an innermost layer, the innermost layer containing a polyamide (A), an impact modifier (B), and a carbon nanotube (C), wherein the number of projections each having a height of 5 μm or more and a longitudinal width of 20 μm or more, which are present on the surface of the innermost layer, is 2 or less per 1 mm$^2$ of surface area; and the number of agglomerates each having a longitudinal width of 5 μm or more, which are present in the cross section of the innermost layer, is 15 or less per 1 mm$^2$ of cross-sectional area. As used in the present invention, the "surface of the innermost layer" means the inner surface of the multilayered tube for transporting liquid chemicals, and the "cross section of the innermost layer" means a cross section which passes through the middle point of the diameter of the tube and is perpendicular to the longitudinal direction thereof. Further, as used in the present invention, the "longitudinal width" means the length of the longest part found when the projections or the agglomerates are observed with an optical microscope.

Figure 1:
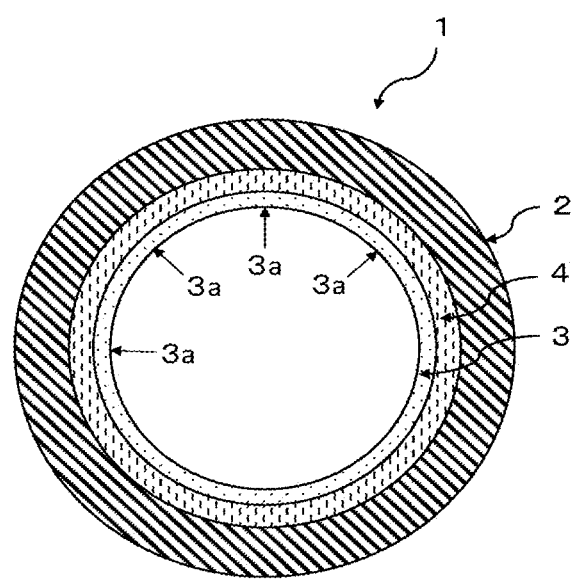
FIG. 1 is a schematic cross-sectional view showing an example of the embodiments of the multilayered tube for transporting liquid chemicals of the present invention.

FIG. 1 is a schematic cross-sectional view showing an example of the embodiments of the multilayered tube for transporting liquid chemicals of the present invention, where reference numeral 1 denotes a multilayered tube for transporting liquid chemicals; reference numeral 2 denotes an outermost layer; reference numeral 3 denotes an innermost layer; and reference character 3a shows the surface of the innermost layer. The multilayered tube for transporting liquid chemicals of the present invention may optionally contain one or more intermediate layers 4 between the outermost layer 2 and the innermost layer 3.

In the multilayered tube for transporting liquid chemicals of the present invention, the number of projections each having a height of 5 μm or more and a longitudinal width of 20 μm or more, which are present on the surface of the innermost layer 3a, is 2 or less per 1 mm$^2$ of surface area. If the number of the projections present on the surface of the innermost layer is more than 2 per 1 mm$^2$ of surface area, the surface roughness of the surface of the innermost layer increases. As a result, the multilayered tube for transporting liquid chemicals is easily cracked when inserted into a part such as a connector to be connected with the multilayered tube, and the impact resistance will be poor. From this point of view, the number of the projections present on the surface of the innermost layer is preferably 1 or less, more preferably 0.8 or less, further preferably 0.5 or less, per 1 mm$^2$ of surface area.

The size and the number of the projections present on the surface of the innermost layer in the multilayered tube for transporting liquid chemicals of the present invention can be observed and measured with an optical microscope, and it can be specifically measured by the method described in Examples.

Note that the projections in the present invention are derived from the agglomerates mainly present in the innermost layer. Further, the agglomerates in the present invention are derived from the agglomeration of the carbon nanotubes (C), and refer to both the agglomerates consisting only of the carbon nanotube (C) and the agglomerates containing resin components (such as the components (A) and (B)) in addition to the carbon nanotube (C).

Further, in the multilayered tube for transporting liquid chemicals of the present invention, the number of agglomerates each having a longitudinal width of 5 μm or more, which are present in the cross section of the innermost layer 3, is 15 or less per 1 mm$^2$ of cross sectional area. If the number of the agglomerates present in the cross section of the innermost layer is more than 15 or more per 1 mm$^2$ of cross sectional area, the impact resistance and the elongation properties of the tube will be reduced, and the tube will also be easily cracked. From this point of view, the number of the agglomerates present in the cross section of the innermost layer is preferably 12 or less, more preferably 10 or less, per 1 mm$^2$ of cross-sectional area.

The number of the agglomerates present in the cross section of the innermost layer in the multilayered tube for transporting liquid chemicals of the present invention can be measured by preparing a section for observing the cross section of the multilayered tube for transporting liquid chemicals using a microtome and observing the cross section of the section with an optical microscope. Specifically, the number of the agglomerates can be measured by the method described in Examples.

In order to adjust, to the ranges described above, the number of the projections present on the surface of the innermost layer and the number of the agglomerates present in the cross section of the innermost layer in the multilayered tube for transporting liquid chemicals of the present invention, any of the following methods for example can be employed in the production of the polyamide resin composition containing the polyamide (A), the impact modifier (B), and the carbon nanotube (C) for constituting the innermost layer: (1) a method including a step of mixing and dispersing the components (A) and (C) with a solvent to obtain a resin mixture and a step of removing the solvent while kneading the resin mixture and then adding the component (B) thereto followed by kneading; (2) a method involving adjusting a device and kneading conditions used when the components (A) to (C) are kneaded; and (3) a method including mixing the components (A) to (C) and a dispersing aid followed by kneading. Among them, the method (1) is preferred in terms of being hardly influenced by the melt viscosity of the resin components and having high production stability.

The reason why the advantageous effects of the present invention is obtained by the above constitution of the multilayered tube for transporting liquid chemicals of the present invention is considered as follows.

In the multilayered tube for transporting liquid chemicals of the present invention, the carbon nanotube (C) is added for imparting conductivity to the innermost layer. However, since the carbon nanotube has fine cavities in the structure, it is difficult to replace air in the cavities with other resin components even if the carbon nanotube is mixed with other resin components. Therefore, the carbon nanotube will not be uniformly mixed with other resin components only by mixing them by a common method, and a problem such as the occurrence of agglomerates derived from the agglomeration of the carbon nanotube may occur. If agglomerates derived from the agglomeration of the carbon nanotube having a size equal to or larger than a predetermined value are present on the surface or in the inner part of the innermost layer of the multilayered tube for transporting liquid chemicals of the present invention, a crack of the tube will be easily generated with the part of the agglomerates as the starting point, and the impact resistance and elongation of the tube will be reduced. Therefore, in the present invention, the number of specific projections present on the surface of the innermost layer and the number of specific agglomerates present in the cross section of the innermost layer is reduced by using a resin composition for forming the innermost layer of the multilayered tube for transporting liquid chemicals which contains predetermined components (A) to (C) and has been prepared preferably using the above methods (1) to (3) or the like. Thus, the present invention can provide a multilayered tube for transporting liquid chemicals which is excellent in conductivity, liquid chemical barrier properties, and impact resistance, hardly generates a crack also when inserted into other members, and is excellent in elongation properties.

[Innermost Layer]

Hereinafter, the materials constituting the innermost layer of the multilayered tube for transporting liquid chemicals of the present invention will be described.

<Polyamide (A)>

The innermost layer of the multilayered tube for transporting liquid chemicals of the present invention contains polyamide (A) in view of imparting liquid chemical barrier properties and chemical resistance. The polyamide (A) used in the present invention may be used without any particular limitation as long as the above advantageous effects can be imparted, and examples include semi-aromatic polyamide, fully aromatic polyamide, and aliphatic polyamide.

Among them, the polyamide (A) is preferably semi-aromatic polyamide in view of imparting high liquid chemical barrier properties, chemical resistance, and heat resistance.

(Semi-Aromatic Polyamide)

The semi-aromatic polyamide as used in the present invention refers to a polyamide containing a dicarboxylic acid unit essentially containing an aromatic dicarboxylic acid unit and a diamine unit essentially containing an aliphatic diamine unit, or a polyamide comprising a dicarboxylic acid unit essentially containing an aliphatic dicarboxylic acid unit and a diamine unit essentially containing an aromatic diamine unit. Here, "essentially containing" refers to constituting 50 to 100 mol %, preferably 60 to 100 mol %, in all the units.

In the semi-aromatic polyamide, the polyamide (A) used in the present invention is preferably a polyamide containing a dicarboxylic acid unit essentially containing an aromatic dicarboxylic acid unit and a diamine unit essentially containing an aliphatic diamine unit, more preferably a semi-aromatic polyamide containing a dicarboxylic acid unit containing 50 to 100 mol % of a terephthalic acid unit and/or a naphthalene dicarboxylic acid unit and a diamine unit containing 60 to 100 mol % of an aliphatic diamine unit having 4 to 18 carbon atoms. Hereinafter, the semi-aromatic polyamide will be described in more detail.

The dicarboxylic acid unit constituting the semi-aromatic polyamide preferably has a content of a terephthalic acid unit and/or a naphthalene dicarboxylic acid unit of 50 to 100 mol %. Thereby, the liquid chemical barrier properties, chemical resistance, and heat resistance of the resulting multilayered tube for transporting liquid chemicals will be improved. The content of the terephthalic acid unit and/or the naphthalene dicarboxylic acid unit in the dicarboxylic acid unit is more preferably in the range of 75 to 100 mol %, further preferably in the range of 90 to 100 mol %.

Examples of the naphthalene dicarboxylic acid unit include those derived from 2,6-naphthalene dicarboxylic acid, 2,7-naphthalene dicarboxylic acid, and 1,4-naphthalene dicarboxylic acid, and 2,6-naphthalene dicarboxylic acid unit is preferred.

Further, the dicarboxylic acid unit is more preferably a terephthalic acid unit.

The dicarboxylic acid unit constituting the semi-aromatic polyamide may preferably contain other dicarboxylic acid units other than the terephthalic acid unit and/or the naphthalene dicarboxylic acid unit in the range of 50 mol % or less. Examples of these other dicarboxylic acid units include the units derived from aliphatic dicarboxylic acids such as malonic acid, dimethylmalonic acid, succinic acid, glutaric acid, adipic acid, 2-methyladipic acid, trimethyladipic acid, pimelic acid, 2,2-dimethylglutaric acid, 2,2-diethylsuccinic acid, azelaic acid, sebacic acid, and suberic acid; alicyclic dicarboxylic acids such as 1,3-cyclopentanedicarboxylic acid and 1,4-cyclohexanedicarboxylic acid; and aromatic dicarboxylic acids such as isophthalic acid, 1,4-phenylenedioxy diacetate, 1,3-phenylenedioxy diacetate, diphenic acid, diphenylmethane-4,4'-dicarboxylic acid, diphenylsulfone-4,4'-dicarboxylic acid, and 4,4'-biphenyl dicarboxylic acid. Other carboxylic acid units may contain these units singly or in combination. The content of these other dicarboxylic acid units in the dicarboxylic acid unit is preferably 25 mol % or less, more preferably 10 mol % or less. Further, the dicarboxylic acid unit may contain the units derived from polyvalent carboxylic acids such as trimellitic acid, trimesic acid, and pyromellitic acid in the range where melt molding is possible.

Further, the diamine unit constituting the semi-aromatic polyamide preferably contains 60 to 100 mol % of an aliphatic diamine unit having 4 to 18 carbon atoms. When the polyamide (A) containing the aliphatic diamine unit having 4 to 18 carbon atoms in this proportion is used, there will be obtained a polyamide resin composition for forming the innermost layer excellent in toughness, abrasion property, heat resistance, moldability, low water absorption properties, and lightweight properties. The content of the aliphatic diamine unit having 4 to 18 carbon atoms in the diamine unit is more preferably in the range of 75 to 100 mol %, further preferably in the range of 90 to 100 mol %.

Examples of the above aliphatic diamine unit having 4 to 18 carbon atoms include the units derived from linear aliphatic diamines such as 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, and 1,18-octadecanediamine; and branched aliphatic diamines such as 2-methyl-1,3-propanediamine, 2-methyl-1,4-butanediamine, 2-methyl-1,5-pentanediamine, 3-methyl-1,5-pentanediamine, 2,2,4-trimethyl-1,6-hexanediamine, 2,4,4-trimethyl-1,6-hexanediamine, 2-methyl-1,8-octanediamine, and 5-methyl-1,9-nonanediamine. The aliphatic diamine unit having 4 to 18 carbon atoms may contain these units singly or in combination.

The above aliphatic diamine unit having 4 to 18 carbon atoms is preferably an aliphatic diamine unit having 6 to 18 carbon atoms, and more preferably a 1,9-nonanediamine unit and/or a 2-methyl-1,8-octanediamine unit, further preferably a 1,9-nonanediamine unit and a 2-methyl-1,8-octanediamine unit, since a multilayered tube for transporting liquid chemicals which is further excellent in heat resistance, low water absorption properties, and liquid chemical barrier properties is obtained. When the diamine unit contains both the 1,9-nonanediamine unit and the 2-methyl-1,8-octanediamine unit, the molar ratio of the 1,9-nonanediamine unit to the 2-methyl-1,8-octanediamine unit is preferably in the range of 1,9-nonanediamine unit/2-methyl-1,8-octanediamine unit=95/5 to 40/60, more preferably in the range of 90/10 to 40/60, and further preferably in the range of 80/20 to 50/50.

The diamine unit constituting the semi-aromatic polyamide may contain other diamine units other than the aliphatic diamine unit having 4 to 18 carbon atoms preferably in the range of 40 mol % or less. Example of these other diamine units include the units derived from aliphatic diamines such as ethylenediamine, 1,2-propanediamine, and 1,3-propanediamine; alicyclic diamines such as cyclohexanediamine, methylcyclohexanediamine, and isophoronediamine; and aromatic diamines such as p-phenylenediamine, m-phenylenediamine, xylylenediamine, 4,4'-diaminodiphenylmethane, sulfone, and 4,4'-diaminodiphenyl ether. Other diamine units may contain these units singly or in combination. The content of these other diamine units in the diamine unit is preferably 25 mol % or less, more preferably 10 mol % or less.

The semi-aromatic polyamide is preferably constituted only by the diamine unit and the dicarboxylic acid unit, but may contain an aminocarboxylic acid unit as long as the advantageous effects of the present invention are not impaired. Examples of the aminocarboxylic acid unit include the units derived from 11-aminoundecanoic acid, 12-aminododecanoic acid, and the like, and the aminocarboxylic acid unit may be contained in combination. The content of the aminocarboxylic acid unit in the polyamide (A) is preferably 40 mol % or less, more preferably 20 mol % or less, and further preferably 10 mol % or less, based on 100 mol % of the total monomer units constituting the polyamide (A).

The semi-aromatic polyamide may contain a lactam unit as long as the advantageous effects of the present invention are not impaired. Examples of the lactam unit include the units derived from ε-caprolactam, enantholactam, undecanelactam, lauryllactam, α-pyrrolidone, α-piperidone, and the like, and the lactam unit may be contained in combination. The content of the lactam unit in the semi-aromatic polyamide is preferably 40 mol % or less, more preferably 20 mol % or less, and further preferably 10 mol % or less, based on 100 mol % of the total monomer units constituting the semi-aromatic polyamide.

Examples of the typical semi-aromatic polyamide containing the dicarboxylic acid unit essentially containing the aromatic dicarboxylic acid unit and the aliphatic diamine unit essentially containing the diamine unit include polyhexamethylene terephthalamide (polyamide 6T), polynonamethylene terephthalamide (polyamide 9T), polydecamethylene terephthalamide (polyamide 10T), polyhexamethylene isophthalamide (polyamide 6I), a copolymer of polyamide GI and polyamide 6T (polyamide 6I/6T), and a copolymer of polyamide 6T and polyundecanamide (polyamide 11) (polyamide 6T/11).

On the other hand, among the semi-aromatic polyamides, with respect to the semi-aromatic polyamide containing a dicarboxylic acid unit essentially containing the aliphatic dicarboxylic acid unit and a diamine unit essentially containing the aromatic diamine unit, examples of the aliphatic dicarboxylic acid unit include a unit derived from the aliphatic dicarboxylic acids described above. The aliphatic dicarboxylic acid unit may contain these units singly or in combination. Further, examples of the aromatic diamine unit include a unit derived from the aromatic diamines described above. The aromatic diamine unit may contain these units singly or in combination. Furthermore, these units may also contain other units as long as the advantageous effects of the present invention are not impaired.

Examples of typical semi-aromatic polyamides containing a dicarboxylic acid unit essentially containing the aliphatic dicarboxylic acid unit and a diamine unit essentially containing the aromatic diamine unit include polymetaxylylene adipamide (MXD6) and a copolymer of p-xylylenediamine and sebacic acid (PXD10).

Although the polyamide (A) blended in the polyamide resin composition of the present invention is preferably constituted only by a semi-aromatic polyamide, a polyamide other than the semi-aromatic polyamide such as a fully aromatic polyamide and an aliphatic polyamide may be used in combination. The content of the polyamide other than the semi-aromatic polyamide in the polyamide (A) is preferably 20% by mass or less, more preferably 10% by mass or less.

(Fully Aromatic Polyamide)

The fully aromatic polyamide means a polyamide containing a dicarboxylic acid unit essentially containing an aromatic dicarboxylic acid unit and a diamine unit essentially containing an aromatic diamine unit. Examples of the aromatic dicarboxylic acid unit and the aromatic diamine unit include the same as those illustrated in the semi-aromatic polyamides described above.

Examples of the fully aromatic polyamide include poly (p-phenylene terephthalamide), poly(m-phenylene isophthalamide), poly(m-xylylene isophthalamide) (MXDI), and poly(p-phenylene-3,4'-oxydiphenylene terephthalamide) in which a terephthalic acid component, a 3,4'-diaminodiphenyl ether component, and a p-phenylenediamine component are copolymerized.

(Aliphatic Polyamide)

The aliphatic polyamide is a polyamide containing an aliphatic polyamide-forming unit, and is specifically obtained by using, as a raw material, lactam, aminocarboxylic acid, or a nylon salt containing an aliphatic diamine and an aliphatic dicarboxylic acid and polymerizing or copolymerizing the raw material by a known method such as melt polymerization, solution polymerization, and solid state polymerization.

Examples of the lactam include the same as those illustrated in the lactam unit described above such as ε-caprolactam, enantholactam, undecanelactam, lauryllactam, α-pyrrolidone, and α-piperidone. Examples of the aminocarboxylic acids include 6-aminocaproic acid, 7-aminoheptanoic acid, 9-aminononanoic acid, 11-aminoundecanoic acid, and 12-aminododecanoic acid. These may be used singly or in combination.

Examples of the aliphatic diamine constituting the nylon salt include ethylenediamine, 1,3-propylenediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, 1,19-nonadecanediamine, 1,20-eicosanediamine, 2/3-methyl-1,5-pentanediamine, 2-methyl-1,8-octanediamine, 2,2,4/2,4,4-trimethyl-1,6-hexanediamine, and 5-methyl-1,9-nonanediamine. These may be used singly or in combination.

Examples of the aliphatic dicarboxylic acid constituting the nylon salt include adipic acid, pimelic acid, suberic acid, azelaic acid, sebacic acid, undecanedicarboxylic acid, dodecanedicarboxylic acid, tridecanedicarboxylic acid, tetradecanedicarboxylic acid, pentadecanedicarboxylic acid, hexadecanedicarboxylic acid, octadecanedicarboxylic acid, and eicosanedicarboxylic acid. These may be used singly or in combination.

Examples of the aliphatic polyamide include homopolymers such as polycaproamide (polyamide 6), polyundecanamide (polyamide 11), polydodecanamide (polyamide 12), polyethylene adipamide (polyamide 26), polytetramethylene adipamide (polyamide 46), polyhexamethylene adipamide (polyamide 66), polyhexamethylene azelamide (polyamide 69), polyhexamethylene sebacamide (polyamide 610), polyhexamethylene undecamide (polyamide 611), polyhexamethylene dodecamide (polyamide 612), polynonamethylene adipamide (polyamide 96), polynonamethylene azelamide (polyamide 99), polynonamethylene sebacamide (polyamide 910), polynonamethylene undecamide (polyamide 911), polynonamethylene dodecamide (polyamide 912), polydecamethylene adipamide (polyamide 106), polydecamethylene azelamide (polyamide 109), polydecamethylene sebacamide (polyamide 1010), polydecamethylene dodecamide (polyamide 1012), polydodecamethylene adipamide (polyamide 126), polydodecamethylene azelamide (polyamide 129), polydodecamethylene sebacamide (polyamide 1210), and polydodecamethylene dodecamide (polyamide 1212), and copolymers obtained by using several raw material monomers forming these homopolymers.

Among them, preferred is at least one homopolymer selected from the group consisting of polycaproamide (polyamide 6), polyhexamethylene adipamide (polyamide 66), polyundecanamide (polyamide 11), polydodecanamide (polyamide 12), and polyhexamethylene dodecamide (polyamide 612); and more preferred is at least one homopolymer selected from the group consisting of polycaproamide (polyamide 6) and polydodecanamide (polyamide 12).

The polyamide (A) is preferably capped with a terminal capping agent at 10% or more of the terminal groups of the polymer chain. The proportion in which the terminal groups of the polymer chain is capped with the terminal capping agent (terminal capping ratio) is more preferably 20% or more. When a polyamide (A) having a terminal capping ratio of 10% or more is used, it is possible to prepare a polyamide resin composition for forming the innermost layer of the multilayered tube for transporting liquid chemicals which is more excellent in physical properties such as melt stability and hot water resistance.

The terminal capping agent is not particularly limited as long as it is a monofunctional compound having reactivity with an amino group or a carboxyl group of polyamide terminals. A monocarboxylic acid or a monoamine is preferred in terms of reactivity, stability, and the like of blocked terminals, and the monocarboxylic acid is more preferred in terms of ease of handling and the like. In addition, a monoisocyanate, a monoacid halide, monoesters, monoalcohols, and the like may also be used as the terminal capping agent.

The monocarboxylic acid used as a terminal capping agent is not particularly limited as long as it has reactivity with an amino group, and examples include aliphatic monocarboxylic acids such as acetic acid, propionic acid, butyric acid, valeric acid, caproic acid, caprylic acid, lauric acid, tridecanoic acid, myristic acid, palmitic acid, stearic acid, pivalic acid, and isobutyric acid; alicyclic monocarboxylic acids such as cyclohexane carboxylic acid; aromatic monocarboxylic acids such as benzoic acid, toluic acid, α-naphthalenecarboxylic acid, β-naphthalenecarboxylic acid, methylnaphthalene carboxylic acid, and phenylacetic acid; and any mixture thereof. Among them, acetic acid, propionic acid, butyric acid, valeric acid, caproic acid, caprylic acid, lauric acid, tridecanoic acid, myristic acid, palmitic acid, stearic acid, and benzoic acid are preferred in term of reactivity, stability of capped terminals, price, and the like.

The monoamine used as a terminal capping agent is not particularly limited as long as it has reactivity with a carboxyl group, and examples include aliphatic monoamines such as methylamine, ethylamine, propylamine, butylamine, hexylamine, octylamine, decylamine, stearylamine, dimethylamine, diethylamine, dipropylamine, and dibutylamine; alicyclic monoamines such as cyclohexylamine and dicyclohexylamine; and aromatic monoamines such as aniline, toluidine, diphenylamine, and naphthylamine; and any mixture thereof. Among them, butylamine, hexylamine, octylamine, decylamine, stearylamine, cyclohexylamine, and aniline are preferred in terms of reactivity, boiling point, stability of capped terminals, price, and the like.

The terminal capping ratio of the polyamide (A) is determined according to the following equation (1) by measuring the number of carboxyl group terminals, amino group terminals, and terminal groups capped with a terminal capping agent which are present in the polyamide (A). The number of each terminal group is preferably determined from the integrated value of characteristic signals corresponding to each terminal group by $^1$H-NMR in terms of accuracy and convenience.

$$\text{Terminal capping ratio (\%)} = [(T-S)/T] \times 100 \quad (1)$$

wherein T represents the total number of terminal groups in the polymer chain of the polyamide (A) (this is normally equal to twice of the number of polyamide molecules); and S represents the sum number of carboxyl group terminals and amino group terminals remaining without being capped.

The polyamide (A) can be produced using any method known as a method for producing polyamide. For example, a polyamide containing a dicarboxylic acid unit and a diamine unit can be produced by a method, such as a solution polymerization method or an interfacial polymerization method using an acid chloride and a diamine as raw materials, or a melt polymerization method, a solid state polymerization method, or a melt extrusion polymerization method using a dicarboxylic acid and a diamine as raw materials.

When the polyamide (A) is produced, phosphoric acid, phosphorous acid, hypophosphorous acid, and a salt or an ester thereof may be added as a catalyst. Examples of the above salt or ester include a salt of phosphoric acid, phosphorous acid, or hypophosphorous acid with a metal such as potassium, sodium, magnesium, vanadium, calcium, zinc, cobalt, manganese, tin, tungsten, germanium, titanium, and antimony; an ammonium salt of phosphoric acid, phosphorous acid, or hypophosphorous acid; and ethyl ester, isopropyl ester, butyl ester, hexyl ester, isodecyl ester, decyl ester, stearyl ester, and phenyl ester of phosphoric acid, phosphorous acid, or hypophosphorous acid. Among them, sodium hypophosphite and phosphorous acid are preferred in terms of being inexpensive and containing only a small amount of triamine.

The polyamide (A) preferably has an intrinsic viscosity [η] measured under a condition of 30° C. in a concentrated sulfuric acid in the range of 0.6 to 2.0 dl/g, more preferably in the range of 0.7 to 1.9 dl/g, and further preferably in the range of 0.8 to 1.8 dl/g. When a polyamide (A) having an intrinsic viscosity of 0.6 dl/g or more is used, the mechanical properties of the innermost layer of the multilayered tube for transporting liquid chemicals formed will be satisfactory. Further, a polyamide (A) having an intrinsic viscosity of 2.0 dl/g or less is used, the moldability of the resulting polyamide resin composition will be satisfactory.

The polyamide (A) preferably has a terminal amino group content ([NH$_2$]) of 5 to 60 µmol/g, more preferably in the range of 5 to 50 µmol/g, and further preferably in the range of 5 to 30 µmol/g. When the terminal amino group content ([NH$_2$]) is 5 µmol/g or more, the compatibility between the polyamide (A) and an impact modifier (B) to be described below will be satisfactory. Further, when the terminal amino group content is 60 µmol/g or less, a reduction in conductivity, a reduction in long-term heat resistance, and a reduction in weld strength can be avoided.

A polyamide (A) which contains a dicarboxylic acid unit and a diamine unit and in which the terminal amino group content ([NH$_2$]) is in the range described above can be produced, for example, in the following manner.

First, a dicarboxylic acid, a diamine, and optionally an aminocarboxylic acid, a lactam, a catalyst, and a terminal blocking agent are mixed to produce a nylon salt. At this time, when the number of moles (X) of all the carboxyl groups and the number of moles (Y) of all the amino groups contained in the above reaction raw materials satisfy the following equation (2), $$-0.5 \leq [(Y-X)/Y] \times 100 \leq 2.0 \qquad (2)$$

a polyamide (A) having a terminal amino group content ([NH$_2$]) of 5 to 60 µmol/g will be easily produced, which is preferred. Next, the nylon salt produced is heated to a temperature of 200 to 250° C. to prepare a prepolymer having an intrinsic viscosity [η] at 30° C. in concentrated sulfuric acid of 0.10 to 0.60 dl/g, and the polymerization degree of the prepolymer can be further increased to thereby obtain a polyamide (A) used in the present invention. When the intrinsic viscosity [η] of the prepolymer is in the range of 0.10 to 0.60 dl/g, a deviation of the molar balance between carboxyl groups and amino groups and a reduction in the rate of polymerization will be small in the stage of increasing the polymerization degree, and there will be obtained a polyamide (A) which has a smaller molecular weight distribution and is more excellent in various types of performance and moldability. When the stage of increasing the polymerization degree is performed by a solid state polymerization method, the stage is preferably performed under reduced pressure or inert gas circulation, and when the polymerization temperature is in the range of 200 to 280° C., the solid state polymerization method has a high polymerization rate, is excellent in productivity, and can effectively suppress discoloration and gelation. Further, when the stage of increasing the polymerization degree is performed by means of a melt extrusion machine, the polymerization temperature is preferably 370° C. or less. When the polymerization is performed under such a condition, almost no polyamide will be decomposed, and a polyamide (A) that is little degraded will be obtained.

Further, a polyamide (A) having a desired terminal amino group content ([NH$_2$]) can also be prepared by using plural types of polyamides each having a different terminal amino group content ([NH$_2$]) in combination. When plural types of polyamides are used in combination, the plural types of polyamides may be used by premixing the polyamides before melt kneading the polyamides with an impact modifier (B) and a carbon nanotube (C) or may be used in the state where the polyamides are not premixed.

The terminal amino group content ([NH$_2$]) as used herein means the amount of terminal amino groups (unit: µmol) contained in 1 g of polyamide (A), and can be determined by neutralization analysis using an indicator.

<Impact Modifier (B)>

The innermost layer of the multilayered tube for transporting liquid chemicals of the present invention contains an impact modifier (B) in view of imparting impact resistance and elongation properties. Examples of the impact modifier (B) used in the present invention include a rubber-like polymer, which preferably has a flexural modulus measured according to ASTM D-790 of 500 MPa or less.

Specific examples include an α-olefin copolymer, an (ethylene and/or propylene)/(α,β-unsaturated carboxylic acid and/or unsaturated carboxylate) copolymer, ionomer, and an aromatic vinyl compound/conjugated diene compound block copolymer. These may be used singly or in combination.

Examples of the above α-olefin copolymer include a copolymer of ethylene and an α-olefin having 3 or more carbon atoms and a copolymer of propylene and an α-olefin having 4 or more carbon atoms. Among them, a copolymer of ethylene and an α-olefin having 3 or more carbon atoms is preferred, and an ethylene-butene copolymer is more preferred.

Examples of the α-olefin having 3 or more carbon atoms include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1- hexene, 3-ethyl-1-hexene, 9-methyl-1-decene, 11-methyl-1-dodecene, and 12-ethyl-1-tetradecene. These may be used singly or in combination.

Further, polyenes such as non-conjugated dienes may be copolymerized, such as 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), dicyclopentadiene, cyclohexadiene, cyclooctadiene, 5-vinyl norbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene, and 2-propenyl-2,5-norbornadiene. These may be used singly or in combination.

The above (ethylene and/or propylene)/($\alpha,\beta$-unsaturated carboxylic acid and/or unsaturated carboxylate) copolymer is a polymer obtained by copolymerizing ethylene and/or propylene and an $\alpha,\beta$-unsaturated carboxylic acid and/or unsaturated carboxylate monomer; examples of the $\alpha,\beta$-unsaturated carboxylic acid monomer include acrylic acid and methacrylic acid; and examples of the $\alpha,\beta$-unsaturated carboxylate monomer include methyl ester, ethyl ester, propyl ester, butyl ester, pentyl ester, hexyl ester, heptyl ester, octyl ester, nonyl ester, and decyl ester, of these unsaturated carboxylic acids. These may be used singly or in combination.

The above ionomer is obtained by ionizing at least a part of the carboxyl groups of a copolymer of olefin and an $\alpha,\beta$-unsaturated carboxylic acid by neutralization with a metal ion. Ethylene is preferably used as the olefin, and acrylic acid and methacrylic acid are preferably used as the $\alpha,\beta$-unsaturated carboxylic acid. However, monomers are not limited to those illustrated here, and an unsaturated carboxylate monomer may be copolymerized. Further, examples of the metal ion include alkali metals and alkaline earth metals such as Li, Na, K, Mg, Ca, Sr, and Ba; and Al, Sn, Sb, Ti, Mn, Fe, Ni, Cu, Zn, and Cd. These may be used singly or in combination.

Further, the aromatic vinyl compound/conjugated diene compound block copolymer is a block copolymer containing an aromatic vinyl compound polymer block and a conjugated diene polymer block, in which a block copolymer having at least one aromatic vinyl compound polymer block and at least one conjugated diene polymer block is used. Further, in the above block copolymer, an unsaturated bond in the conjugated diene polymer block may be hydrogenated.

The aromatic vinyl compound polymer block is a polymer block essentially composed of a structural unit derived from an aromatic vinyl compound. Examples of the aromatic vinyl compound in this case include styrene, $\alpha$-methylstyrene, o-methylstyrene, m-methylstyrene, p-methylstyrene, 2,4-dimethylstyrene, vinylnaphthalene, vinylanthracene, 4-propylstyrene, 4-cyclohexylstyrene, 4-dodecylstyrene, 2-ethyl-4-benzylstyrene, and 4-(phenylbutyl)styrene. These may be used singly or in combination. Further, the aromatic vinyl compound polymer block may optionally have a structural unit containing a small amount of other unsaturated monomers. The conjugated diene polymer block is a polymer block formed from one or more conjugated diene compounds such as 1,3-butadiene, chloroprene, isoprene, 2,3-dimethyl-1,3-butadiene, 1,3-pentadiene, 4-methyl-1,3-pentadiene, and 1,3-hexadiene, and in the hydrogenated aromatic vinyl compound/conjugated diene compound block copolymer, a part or all of the unsaturated bond parts in the conjugated diene polymer block are saturated bonds by hydrogenation.

The molecular structure of the aromatic vinyl compound/conjugated diene compound block copolymer and the hydrogenated products thereof may be any of linear, branched, radial, or any combination thereof. Among them, a diblock copolymer in which one aromatic vinyl compound polymer block is linearly bonded to one conjugated diene polymer block, a triblock copolymer in which three polymer blocks are linearly bonded in the order of an aromatic vinyl compound polymer block-a conjugated diene polymer block-an aromatic vinyl compound polymer block, and one or more hydrogenated products thereof are preferably used as the aromatic vinyl compound/conjugated diene compound block copolymer and/or hydrogenated products thereof. Examples include a non-hydrogenated or hydrogenated styrene/butadiene block copolymer, a non-hydrogenated or hydrogenated styrene/isoprene block copolymer, a non-hydrogenated or hydrogenated styrene/isoprene/styrene block copolymer, a non-hydrogenated or hydrogenated styrene/butadiene/styrene block copolymer, and a non-hydrogenated or hydrogenated styrene/isoprene/butadiene/styrene block copolymer.

Further, the $\alpha$-olefin copolymer, (ethylene and/or propylene)/($\alpha,\beta$-unsaturated carboxylic acid and/or unsaturated carboxylate) copolymer, ionomer, and aromatic vinyl compound/conjugated diene compound block copolymer used as the impact modifier is preferably a polymer modified with an unsaturated compound having a carboxyl group and/or an acid anhydride group (hereinafter may also be referred to as a "modified polymer"). This is because, by modifying with such a component, a terminal amino group contained in the polyamide (A) is allowed to react with a carboxyl group and/or an acid anhydride group contained in the polymer which is the component (B), thereby increasing the compatibility of the interface between the phase (A) and the phase (B) to improve impact resistance and elongation properties.

Among the above modified polymers, a modified polymer of the $\alpha$-olefin copolymer is preferred; a modified polymer of a copolymer of ethylene and an $\alpha$-olefin having 3 or more carbon atoms is more preferred; and a modified polymer of an ethylene-butene copolymer is further preferred.

Examples of the unsaturated compound having a carboxyl group in the modified polymer modified with an unsaturated compound having a carboxyl group and/or an acid anhydride group include $\alpha,\beta$-unsaturated carboxylic acids such as acrylic acid, methacrylic acid, maleic acid, fumaric acid, and itaconic acid. Further, examples of the unsaturated compound having an acid anhydride group include a dicarboxylic anhydride having an $\alpha,\beta$-unsaturated bond such as maleic anhydride and itaconic anhydride. As the unsaturated compound having a carboxyl group and/or an acid anhydride group, a dicarboxylic anhydride having an $\alpha,\beta$-unsaturated bond is preferred, and maleic anhydride is more preferred.

The content of the carboxyl group and acid anhydride group in the above modified polymer is preferably in the range of 25 to 200 $\mu$mol/g, more preferably in the range of 50 to 100 $\mu$mol/g. When the content of the functional groups described above is 25 $\mu$mol/g or more, the improvement effect of impact resistance is sufficient, and on the other hand, when the content is 200 $\mu$mol/g or less, it is possible to avoid a reduction in moldability due to a reduction in the flowability of the resulting polyamide resin composition for forming the innermost layer.

Examples of a modification method with an unsaturated compound having a carboxyl group and/or an acid anhydride group include a method in which when the above α-olefin copolymer, (ethylene and/or propylene)/(α,β-unsaturated carboxylic acid and/or unsaturated carboxylate) copolymer, ionomer, and aromatic vinyl compound/conjugated diene compound block copolymer (hereinafter also referred to as a "base resin") is produced by addition polymerization, the base resin is copolymerized with the unsaturated compound having a carboxyl group and/or an acid anhydride group; and a method in which the above base resin is grafted with the unsaturated compound having a carboxyl group and/or an acid anhydride group. Among them, it is preferred to modify the above base resin with the unsaturated compound having a carboxyl group and/or an acid anhydride group by grafting reaction.

Examples of commercially available products of the impact modifier (B) used in the present invention include "Tafmer" manufactured by Mitsui Chemicals, Inc.

<Carbon Nanotube (C)>

The innermost layer of the multilayered tube for transporting liquid chemicals of the present invention contains a carbon nanotube (C) in view of imparting conductivity thereto in order to remove static electricity generated by friction when the liquid chemicals are transported. The carbon nanotube (C) has a low specific gravity as compared with other conductive fillers and has high conductivity. Therefore, the carbon nanotube (C) can impart high conductivity even if the content is low, and thus it is excellent in terms of the balance between a conductivity-imparting effect and a reinforcing effect.

The carbon nanotube (C) used in the present invention may have a single layer structure or a multilayer structure. Further, a carbon material partially having a structure of a carbon nanotube may also be used. Furthermore, the shape of the carbon nanotube is not limited to a cylindrical shape but may have a coiled shape in which a spiral makes a round at a pitch of 1 μm or less.

The carbon nanotube (C) is available as a commercially available product, and examples include BAYTUBES C 150 P (manufactured by Bayer Material Science Co., Ltd.), NANOCYL NC7000 (manufactured by Nanocyl, Inc.), VGCF-X (manufactured by Showa Denko K.K.), and BN fibril available from Hyperion Catalysis International, Inc. Note that the carbon nanotube may also be referred to as graphite fibril, carbon fibril, and the like in addition to the name of a carbon nanotube.

The diameter of the carbon nanotube is preferably 0.5 to 100 nm, more preferably 1 to 30 nm. When the diameter of the carbon nanotube (C) is 0.5 nm or more, conductivity, impact resistance, and elongation properties may not be reduced since dispersibility is satisfactory. On the other hand, when the diameter is 100 nm or less, conductivity and impact resistance may also not be reduced since the surface state of the resulting innermost layer will be satisfactory. The aspect ratio of the carbon nanotube (C) is preferably 5 or more, more preferably 50 or more, in view of imparting satisfactory conductivity.

The innermost layer of the multilayered tube for transporting liquid chemicals of the present invention may optionally contain other resins than the polyamide (A) and the impact modifier (B), other fillers than the carbon nanotube (C), and other components such as a nucleating agent, a stabilizing agent to heat, light, or oxygen, a copper-based stabilizer, a coloring agent, an antistatic agent, a plasticizer, a lubricant, a flame retardant, and a flame retardant auxiliary.

Examples of other resins include a polyether resin such as polyacetal and polyphenylene oxide; a polysulfone resin such as polysulfone and polyethersulfone; a polythioether resin such as polyphenylene sulfide and polythioether sulfone; a polyketone resin such as polyether ether ketone and polyallyl ether ketone; a polynitrile resin such as polyacrylonitrile, polymethacrylonitrile, an acrylonitrile-styrene copolymer, an acrylonitrile-butadiene-styrene copolymer, and a methacrylonitrile-butadiene-styrene copolymer; a polymethacrylate resin such as polymethyl methacrylate and polyethyl methacrylate; a polyvinyl ester resin such as polyvinyl acetate; a polyvinyl chloride resin such as polyvinylidene chloride, polyvinyl chloride, a vinyl chloride-vinylidene chloride copolymer, and a vinylidene chloride-methyl acrylate copolymer; a cellulose resin such as cellulose acetate and cellulose butyrate; a fluororesin such as polyvinylidene fluoride, polyvinyl fluoride, an ethylene-tetrafluoroethylene copolymer, polychlorotrifluoroethylene, an ethylene-chlorotrifluoroethylene copolymer, a tetrafluoroethylene-hexafluoropropylene copolymer, and a tetrafluoroethylene-hexafluoropropylene-vinylidene fluoride copolymer; a polycarbonate resin; a polyimide resin such as thermoplastic polyimide, polyamideimide, and polyether imide; and a thermoplastic polyurethane resin.

Examples of other fillers include fibrous fillers such as glass fiber; powder fillers such as calcium carbonate, wollastonite, silica, silica alumina, alumina, titanium dioxide, potassium titanate, magnesium hydroxide, and molybdenum disulfide; and flaky fillers such as hydrotalcite, a glass flake, mica, clay, montmorillonite, and kaolin.

The nucleating agent is not particularly limited as long as it is generally used as a nucleating agent of polyamide, and examples include talc, calcium stearate, aluminum stearate, barium stearate, zinc stearate, antimony oxide, magnesium oxide, and any mixture thereof. Among them, talc is preferred because it has a high effect of increasing the crystallization rate of polyamide. The nucleating agent may be treated with a silane coupling agent, a titanium coupling agent, or the like for the purpose of improving compatibility with polyamide.

The stabilizing agent to heat, light, or oxygen is not particularly limited as long as it is generally used as a stabilizing agent of polyamide, and examples include a hindered phenol compound, a hindered amine compound, a phenylenediamine compound, a phenol compound, a benzotriazole compound, a benzophenone compound, a phenyl salicylate compound, an epoxy compound, a phosphite compound, a phosphonite compound, a phosphorus compound, a thio compound, a thioether compound, a tin compound, and halogenated metal. Preferably, the stabilizing agent to heat, light, or oxygen is a halide (examples: chloride, bromide, and iodide) of a group I metal of the periodic table (examples: sodium, potassium, and lithium), copper (I) halide (examples: copper (I) chloride, copper (I) bromide, and copper (I) iodide), and a combination of the halide of the group I metal of the periodic table and the copper (I) halide; and the copper (I) halide is more preferred.

The plasticizer is not particularly limited as long as it is generally used as a plasticizer of polyamide, and examples include a benzenesulfonic acid alkylamide compound, a toluenesulfonic acid alkylamide compound, and a hydroxybenzoic acid alkyl ester compound.

The lubricant is not particularly limited as long as it is generally used as a lubricant of polyamide, and examples include a higher fatty acid compound, a hydroxy fatty acid compound, a fatty acid amide compound, an alkylene-bis fatty acid amide compound, a fatty acid lower alcohol ester compound, a metal soap compound, and polyolefin wax. A fatty acid amide compound such as stearamide, palmitamide, methylene-bis-stearylamide, and ethylene-bis-stearylamide is preferred since it is excellent in an external lubricity effect.

The content of these other components in the innermost layer of the multilayered tube for transporting liquid chemicals is preferably 50% by mass or less, more preferably 20% by mass or less, and further preferably 5% by mass or less.

The innermost layer of the multilayered tube for transporting liquid chemicals of the present invention contains the polyamide (A), the impact modifier (B), the carbon nanotube (C), and optionally other components described above. The ratio of the components (A), (B), and (C) to be used is preferably 40 to 96.5 parts by mass of the polyamide (A), 3 to 30 parts by mass of the impact modifier (B), and 0.5 to 30 parts by mass of the carbon nanotube (C), more preferably 60 to 94.5 parts by mass of the polyamide (A), 5 to 20 parts by mass of the impact modifier (B), and 0.5 to 20 parts by mass of the carbon nanotube (C), and further preferably 65 to 94 parts by mass of the polyamide (A), 5 to 20 parts by mass of the impact modifier (B), and 1 to 15 parts by mass of the carbon nanotube (C), based on 100 parts by mass of the total of the polyamide (A), the impact modifier (B), and the carbon nanotube (C).

The total content of the polyamide (A), the impact modifier (B), and the carbon nanotube (C) in the innermost layer is preferably 50% by mass or more, more preferably 80% by mass or more, further preferably 95% by mass or more, and 100% by mass as the upper limit.

[Polyamide Resin Composition and Method for Producing the Same]

The innermost layer of the multilayered tube for transporting liquid chemicals of the present invention is constituted by a polyamide resin composition containing the polyamide (A), the impact modifier (B), the carbon nanotube (C), and optionally other components described above. Each component contained in the polyamide resin composition, the content, and its preferred embodiments are the same as described above.

The polyamide resin composition can form the innermost layer having the state of the surface and the cross section as described above, and at least one method selected from the following (1) to (3) is preferably used as a method for producing the polyamide resin composition. The following methods can also be used in combination:
(1) a method including a step of mixing and dispersing the polyamide (A), the carbon nanotube (C), and a solvent to obtain a resin mixture and a step of removing the solvent while kneading the resin mixture and then adding the impact modifier (B) thereto followed by kneading;
(2) a method involving adjusting a device and kneading conditions used when the polyamide (A), the impact modifier (B), and the carbon nanotube (C) are kneaded; and
(3) a method of mixing the polyamide (A), the impact modifier (B), the carbon nanotube (C), and a dispersing aid followed by kneading.

A production method including the following steps of (1A) and (1B), which is the above method (1), will be described:
(1A) a step of mixing and dispersing the polyamide (A), the carbon nanotube (C), and a solvent to obtain a resin mixture; and
(1B) a step of removing the solvent while kneading the resin mixture and then adding the impact modifier (B) thereto followed by kneading.

<Step (1A)>

The step (1A) is a step of mixing and dispersing the polyamide (A), the carbon nanotube (C), and a solvent to obtain a resin mixture. A method of mixing and dispersing these components to obtain a resin mixture in the step (1A) is not particularly limited, but examples include the following methods.
(a) The polyamide (A) and the carbon nanotube (C) are mixed and dispersed, and then the solvent is further added thereto followed by further mixing.
(b) The carbon nanotube (C) and the solvent are mixed, and then the polyamide (A) is further added thereto followed by further mixing and dispersing.
(c) The polyamide (A), the carbon nanotube (C), and the solvent are collectively mixed and dispersed.

Among the above (a) to (c), the method (a) is preferred in terms of ease in mixing and high dispersibility.

The solvent used in the step (1A) is not particularly limited as long as it is removed from the system by evaporation when the resin mixture is kneaded and has a boiling point such that it does not remain in the resulting resin composition. Specifically, water and alcohols are preferably used in consideration of the influence on work environment, cost, handleability, and the like, and water is particularly preferred. When alcohols are used, ethanol is preferred. Further, water and alcohols may be used in combination.

The amount of the solvent used in the step (1A) may be equal to the amount required for dispersing the carbon nanotube (C) or more and equal to the amount where the solvent can be removed with a kneading apparatus or less. Specifically, the mass ratio of the carbon nanotube (C) to the solvent in the resin mixture is preferably 100:100 to 100:1000, more preferably 100:100 to 100:900, and further preferably 100:150 to 100:800.

In the step (1A), it is preferred to prepare the resin mixture, for example, by mixing and dispersing the polyamide (A) and the carbon nanotube (C) and then adding the solvent to the resulting mixed dispersion. The above description is applied to the case of the above (a), but the mixing and dispersing can be performed in the same manner also in the case of the above (b) and (c).

The method of mixing and dispersing the above components is not particularly limited as long as the components can be uniformly mixed and dispersed, and the dispersion treatment can be performed using, for example, a Henschel mixer, a super mixer, an ultrasonic homogenizer, a spiral mixer, a planetary mixer, a disperser, a hybrid mixer, or the like. These dispersion machines may be used in combination. Particularly, the Henschel mixer, the super mixer, and the ultrasonic homogenizer are preferably used in view of high dispersibility and damage suppression of the carbon nanotube (C). Further, after the above treatment, the dispersion may be thoroughly performed using a ball mill, a vibrating mill, a sand mill, a roll mill, or the like in the range where the carbon nanotube is not damaged.

Note that the mixing and dispersing is performed by arbitrarily adjusting the treatment temperature, the treatment time, and the like in the mixing and dispersing.

<Step (1B)>

The step (1B) is a step of removing the solvent while kneading the resin mixture obtained at the step (1A) and then adding the impact modifier (B) thereto followed by kneading. The kneading method is not particularly limited, and the kneading can be performed using, for example, an extruder, a kneader mixer, a Banbury mixer, or the like. Among them, it is preferred to knead using an extruder.

The treatment temperature and pressure during solvent removal can be arbitrarily adjusted according to the polyamide (A), the impact modifier (B), the solvent, and the like to be used, but treatment at high temperatures is preferred. Preferably, the treatment temperature is 100 to 370° C.

In this step, the impact modifier (B) is preferably fed and kneaded from the middle of the extruder. After passing through the above treatment, a polyamide resin composition granulated into pellet form or flake form is finally obtained.

Further, it is also possible to mix, in a predetermined proportion, the components (A) and (B) with a high concentration article (masterbatch) in which the content of the carbon nanotube (C) is high and then granulate the resulting mixture by means of the above extruder and a kneading machine such as a roll.

Next, the method (2) described above, that is, "a method involving adjusting a device and kneading conditions used when the polyamide (A), the impact modifier (B), and the carbon nanotube (C) are kneaded" will be described.

Examples of the method (2) include preparing a polyamide resin composition by using an extruder for kneading a mixture in which the polyamide (A), the impact modifier (B), the carbon nanotube (C), and optionally the above other components are blended and by performing the kneading with arbitral selection of various kneading conditions such as the shape of a screw in the extruder and the temperature and time during the kneading.

The method (3) described above is a method including adding a dispersing agent for the purpose of improving the dispersibility of the carbon nanotube (C). Examples of the dispersing agent include polyethylene oxide having an aryl group in a side chain.

Examples of the method of adding the dispersing agent include a method involving mixing and dispersing in the same manner as in the step (1A) described in the above method (1).

In the polyamide resin composition of the present invention, the number of agglomerates each having a longitudinal width of 5 μm or more is 10 or less, preferably 8 or less, more preferably 5 or less, per 1 $mm^2$. In the multilayered tube for transporting liquid chemicals of the present invention, when a polyamide resin composition in which the number of the above agglomerates is 10 or less per 1 $mm^2$ is used, the number of projections each having a height of 5 μm or more and a longitudinal width of 20 μm or more, which are present on the surface of the innermost layer, can be 2 or less per 1 $mm^2$ of surface area; and the number of agglomerates each having a longitudinal width of 5 μm or more, which are present in the cross section of the innermost layer, can be 15 or less per 1 $mm^2$ of cross-sectional area. The polyamide resin composition of the present invention can be preferably obtained by the production method described above.

Note that the agglomerates in the resin composition in the present invention are derived from the agglomeration of the carbon nanotube (C) and mean both the agglomerates consisting only of the carbon nanotubes (C) and the agglomerates containing the resin components (such as the components (A) and (B)) in addition to the carbon nanotube (C).

When this polyamide resin composition is used, the effect of being capable of performing stable production will also be generated in the production of the multilayered tube for transporting liquid chemicals of the present invention without an increase in resin pressure and without degradation due to stagnation since a filter of an extruder is hardly clogged.

The size and the number of the agglomerates present in the polyamide resin composition of the present invention are determined by observing and measuring the cross section of the pellets of the resin composition with an optical microscope, and specifically, they can be measured by the method described in Examples.

The innermost layer of the multilayered tube for transporting liquid chemicals of the present invention has a layer thickness of preferably in the range of 0.01 to 1 mm, more preferably in the range of 0.02 to 0.7 mm, and further preferably in the range of 0.03 to 0.5 mm. When the layer thickness is 0.01 mm or more, conductivity, liquid chemical barrier properties, and impact resistance will be satisfactory. Further, when the layer thickness of the innermost layer is 1 mm or less, economical efficiency and flexibility will be satisfactory.

The layer thickness of the innermost layer of the multilayered tube for transporting liquid chemicals can be measured from the actual image of the cross section of the tube by observing the cross section of the tube with a microscope.

The surface resistivity of the innermost layer of the multilayered tube for transporting liquid chemicals of the present invention is preferably in the range of $10^3$ to $10^6 \Omega/$, more preferably in the range of $10^3$ to $10^5 \Omega/$, and further preferably in the range of $10^3$ to $10^4 \Omega/$. When the surface resistivity is $10^6 \Omega/$ or less, particularly $10^4$ or less, generation of static electricity during the transportation of liquid chemicals can be suppressed on a long-term basis.

The surface resistivity of the innermost layer of the multilayered tube for transporting liquid chemicals can be specifically measured by the method described in Examples.

[Outermost Layer]

Next, the outermost layer of the multilayered tube for transporting liquid chemicals of the present invention will be described.

As a material constituting the outermost layer, a thermoplastic resin is preferred in view of the moldability of the tube. Specific examples include polyester resins such as polybutylene terephthalate, polyethylene terephthalate, polyethylene naphthalate, polybutylene naphthalate, and polyethylene isophthalate; fluororesins such as an ethylene-tetrafluoroethylene copolymer (ETFE), a vinylidene fluoride polymer (PVDF), polychlorotrifluoroethylene, an ethylene-chlorotrifluoroethylene copolymer, a tetrafluoroethylene-hexafluoropropylene copolymer, and a tetrafluoroethylene-hexafluoropropylene-vinylidene fluoride copolymer; polyolefin resins such as polyethylene, polypropylene, polystyrene, and a saponified ethylene-vinyl acetate copolymer (EVOH); polyether resins such as polyacetal and polyphenylene sulfide; and polyamide resins such as semi-aromatic polyamide and aliphatic polyamide.

The material constituting the outermost layer can be arbitrarily selected from the above materials in consideration of the adhesion with a layer in contact with the inside of the outermost layer and the like. For example, when the layer in contact with the inside of the outermost layer is the innermost layer described above, the material constituting the outermost layer is preferably a material excellent in the adhesion with the innermost layer and liquid chemical barrier properties. In view of mechanical properties, heat resistance, and liquid chemical barrier properties, at least one material selected from the group consisting of polyolefin resins and polyamide resins are preferred; at least one material selected from the group consisting of polyolefin resins and aliphatic polyamide are more preferred; and aliphatic polyamide is further preferred.

Examples of the polyolefin resins include polyolefin resins such as high density polyethylene (HDPE), medium density polyethylene (MDPE), low density polyethylene (LDPE), linear low density polyethylene (LLDPE), ultra high molecular weight polyethylene (UHMWPE), polypropylene (PP), an ethylene-propylene copolymer (EPR), an ethylene-butene copolymer (EBR), an ethylene-vinyl acetate copolymer (EVA), a saponified ethylene-vinyl acetate copolymer (EVOH), an ethylene-acrylic acid copolymer (EAA), an ethylene-methacrylic acid copolymer (EMAA), an ethylene-methyl acrylate copolymer (EMA), an ethylene-methyl methacrylate copolymer (EMMA), and an ethylene-ethyl acrylate copolymer (EEA); and polyolefin resins modified with a carboxyl group such as acrylic acid, methacrylic acid, maleic acid, fumaric acid, itaconic acid, crotonic acid, mesaconic acid, citraconic acid, glutaconic acid, cis-4-cyclohexene-1,2-dicarboxylic acid, and endo-bicyclo-[2.2.1]-5-heptene-2,3-dicarboxylic acid, a metal salt (Na, Zn, K, Ca, and Mg) thereof, an acid anhydride group such as maleic anhydride, itaconic anhydride, citraconic anhydride, and endo-bicyclo[2.2.1]-5-heptene-2,3-dicarboxylic anhydride, a compound having an epoxy group such as glycidyl acrylate, glycidyl methacrylate, glycidyl ethacrylate, glycidyl itaconate, and glycidyl citraconate, and the like.

Among them, preferred is at least one selected from the group consisting of high density polyethylene (HDPE), medium density polyethylene (MDPE), low density polyethylene (LDPE), linear low density polyethylene (LLDPE), ultra high molecular weight polyethylene (UHMWPE), and polypropylene (PP).

As the polyamide resin, the same as those illustrated in the polyamide (A) described above can be used. Among them, preferred is aliphatic polyamide; preferred is at least one homopolymer selected from the group consisting of polycaproamide (polyamide 6), polyhexamethylene adipamide (polyamide 66), polyundecanamide (polyamide 11), polydodecanamide (polyamide 12), and polyhexamethylene dodecamide (polyamide 612) or a copolymer obtained by using various raw material monomers forming these aliphatic polyamides; and more preferred is at least one homopolymer selected from the group consisting of polydodecanamide (polyamide 12) and polyhexamethylene dodecamide (polyamide 612).

The outermost layer of the multilayered tube for transporting liquid chemicals of the present invention has a layer thickness of preferably in the range of 0.1 to 5 mm, more preferably in the range of 0.1 to 3 mm, and further preferably in the range of 0.2 to 1 mm. When the layer thickness is 0.1 mm or more, impact resistance and elongation properties will be satisfactory. Further, when the layer thickness of the outermost layer is 5 mm or less, economical efficiency will be satisfactory. The layer thickness can be measured in the same manner as described above.

[Intermediate Layer]

The layer constitution of the multilayered tube for transporting liquid chemicals of the present invention is not particularly limited as long as it contains at least the outermost layer and the innermost layer described above. As shown in FIG. 1, the layer constitution may be a constitution in which the multilayered tube for transporting liquid chemicals of the present invention contains at least one intermediate layer between the outermost layer and the innermost layer.

As the materials constituting the intermediate layer, the same materials as those illustrated as a material constituting the outermost layer described above can be used. Among them, the intermediate layer preferably contains at least one layer having liquid chemical barrier properties (hereinafter also referred to as an "intermediate barrier layer"). From this point of view, the material constituting the intermediate barrier layer is preferably at least one material selected from the group consisting of a saponified ethylene-vinyl acetate copolymer (EVOH), fluororesin, semi-aromatic polyamide, and aliphatic polyamide, more preferably at least one material selected from the group consisting of EVOH and semi-aromatic polyamide.

Examples of the fluororesin include an ethylene-tetrafluoroethylene copolymer (ETFE), a vinylidene fluoride polymer (PVDF), polychlorotrifluoroethylene, an ethylene-chlorotrifluoroethylene copolymer, a tetrafluoroethylene-hexafluoropropylene copolymer, and a tetrafluoroethylene-hexafluoropropylene-vinylidene fluoride copolymer. Among them, at least one selected from the group consisting of ETFE and PVDF is preferred.

As the semi-aromatic polyamide, the same as those illustrated in the polyamide (A) described above can be used.

Among the semi-aromatic polyamide, preferred is at least one selected from the group consisting of polynonamethylene terephthalamide (polyamide 9T), polydecamethylene terephthalamide (polyamide 10T), polyamide 6T/11, polyamide 6T/12, polymetaxylylene adipamide (MXD6), and a copolymer of p-xylylenediamine and sebacic acid (PXD10), polyamide 10T/11, polyamide 10T/12.

As the aliphatic polyamide, the same as those illustrated in the polyamide (A) described above can be used.

Among them, preferred is at least one selected from the group consisting of polycaproamide (polyamide 6), polyhexamethylene adipamide (polyamide 66), polyundecanamide (polyamide 11), polydodecanamide (polyamide 12), and polyhexamethylene dodecamide (polyamide 612); and more preferred is at least one selected from the group consisting of polycaproamide (polyamide 6), polydodecanamide (polyamide 12), and polyhexamethylene dodecamide (polyamide 612).

The total layer thickness of the intermediate barrier layer is preferably in the range of 0.1 to 1.0 mm, more preferably in the range of 0.15 to 0.5 mm, in terms of imparting liquid chemical barrier properties. Further, the intermediate barrier layer preferably contains two layers or more, and the "total layer thickness" in this case means the sum of the layer thicknesses of the intermediate barrier layers.

Further, an adhesive layer may also be contained between the outermost layer and the innermost layer in order to improve interlaminar adhesion properties. The material constituting the adhesive layer can be arbitrarily selected in consideration of the adhesion with each layer in contact with the adhesive layer, and the like. For example, when the material constituting the outermost layer is polyethylene, examples of a preferred adhesive layer include an adhesive layer containing maleic anhydride-modified polyethylene. Further, the intermediate barrier layer may have a function as the adhesive layer. The adhesive layer preferably has a layer thickness per one layer in the range of 0.01 to 0.3 mm, more preferably in the range of 0.03 to 0.2 mm. The adhesive layer may contain two layers or more.

The number of the layers constituting the multilayered tube for transporting liquid chemicals of the present invention is preferably two to seven layers, more preferably three to six layers, in terms of the advantageous effects of the present invention of being excellent in conductivity, liquid chemical barrier properties, and impact resistance, hardly generating a crack also when inserted into other members, and being excellent in elongation properties, and in view of productivity.

Examples of preferred layer constitution of the multilayered tube for transporting liquid chemicals include the following constitutions. Note that, in the following descriptions, the notation of, for example, A/B/C shows that layers are sequentially laminated in the order of A, B, and C from the innermost layer of the multilayered tube for transporting liquid chemicals.

(1) Two-layer structure of innermost layer/outermost layer (2) Three-layer structure of innermost layer/intermediate barrier layer/outermost layer or innermost layer/adhesive layer/outermost layer (3) Four layer structure of innermost layer/adhesive layer/intermediate barrier layer/outermost layer, innermost layer/intermediate barrier layer 1/intermediate barrier layer 2/outermost layer, or innermost layer/intermediate barrier layer/adhesive layer/outermost layer (4) Five layer structure of innermost layer/adhesive layer 1/intermediate barrier layer/adhesive layer 2/outermost layer, innermost layer/intermediate barrier layer 1/intermediate barrier layer 2/adhesive layer/outermost layer, innermost layer/adhesive layer/intermediate barrier layer 1/intermediate barrier layer 2/outermost layer, innermost layer/intermediate barrier layer 1/adhesive layer/intermediate barrier layer 2/outermost layer, or innermost layer/intermediate barrier layer 1/intermediate barrier layer 2/intermediate barrier layer 3/outermost layer (5) Six layer structure of innermost layer/adhesive layer 1/intermediate barrier layer 1/intermediate barrier layer 2/adhesive layer 2/outermost layer, innermost layer/adhesive layer 1/intermediate barrier layer 1/adhesive layer 2/intermediate barrier layer 2/outermost layer, innermost layer/intermediate barrier layer 1/adhesive layer 1/intermediate barrier layer 2/adhesive layer 2/outermost layer, innermost layer/adhesive layer/intermediate barrier layer 1/intermediate barrier layer 2/intermediate barrier layer 3/outermost layer, innermost layer/intermediate barrier layer 1/intermediate barrier layer 2/intermediate barrier layer 3/adhesive layer/outermost layer, or innermost layer/intermediate barrier layer 1/intermediate barrier layer 2/intermediate barrier layer 3/intermediate barrier layer 4/outermost layer Among them, any one of the above layer constitutions (2) to (5) is preferred. Further, in the above layer constitutions (2) to (5), it is more preferred that the intermediate barrier layer is constituted by at least one material selected from the group consisting of a saponified ethylene-vinyl acetate copolymer (EVOH), fluororesin, semi-aromatic polyamide, and aliphatic polyamide, and the outermost layer is constituted by at least one material selected from the group consisting of polyolefin resin and polyamide resin; and it is further preferred that the intermediate barrier layer is constituted by at least one material selected from the group consisting of a saponified ethylene-vinyl acetate copolymer (EVOH) and semi-aromatic polyamide, and the outermost layer is constituted by at least one material selected from the group consisting of polyolefin resin and aliphatic polyamide resin.

Particularly preferred layer constitution of the multilayered tube for transporting liquid chemicals of the present invention is as follows. Note that, in the following constitutions, (a) to (e) are continuous and adhere to each other at the interface.

<Constitution 1>
(a) Innermost layer
(b) At least one adhesive layer (optional)
(c) At least one intermediate barrier layer containing EVOH (optional)
(d) At least one adhesive layer
(e) Outermost layer containing at least one aliphatic polyamide <Constitution 2>
(a) Innermost layer
(b) At least one intermediate barrier layer containing semi-aromatic polyamide (optional)
(c) At least one adhesive layer (optional)
(d) Outermost layer containing at least one aliphatic polyamide <Constitution 3>
(a) Innermost layer
(b) At least one intermediate barrier layer containing semi-aromatic polyamide (optional)
(c) At least one adhesive layer
(d) Outermost layer containing at least one polyolefin resin The outer diameter of the multilayered tube for transporting liquid chemicals is not limited. However, the thickness is designed in consideration of the flow rate of liquid chemicals such that the liquid chemical permeability is not increased, that the burst pressure of a common tube can be maintained, and that the flexibility is secured for the desirable ease of attachment work of the tube and vibration resistance. Preferably, the outer diameter is 2.5 to 200 mm; the inner diameter is 2 to 190 mm; and the thickness is 0.5 to 20 mm.

<Method for Producing Multilayered Tube for Transporting Liquid Chemicals>

The production of the multilayered tube for transporting liquid chemicals of the present invention can be performed using a molding method such as injection molding and extrusion molding. Further, these molding methods can also be employed in combination.

Examples of extrusion molding include a method including melt extruding with extruders corresponding to the number of layers or the number of materials, and simultaneously laminating the extruded materials in or outside a die (co-extrusion method); and a method including producing single-layer tubes in advance, successively arranging them outside, and integrating their resins optionally using an adhesive to laminate them (coating method). The multilayered tube for transporting liquid chemicals of the present invention is preferably produced by a co-extrusion method.

<Liquid Chemical>

The multilayered tube for transporting liquid chemicals of the present invention is excellent in liquid chemical barrier properties and heat resistance. Examples of the liquid chemicals include aromatic hydrocarbon solvents such as benzene, toluene, and xylene, alcohols such as methanol, ethanol, propanol, butanol, pentanol, ethylene glycol, propylene glycol, diethylene glycol, phenol, cresol, polyethylene glycol, and polypropylene glycol, phenolic solvents, ether solvents such as dimethyl ether, dipropyl ether, methyl-t-butyl ether, dioxane, and tetrahydrofuran, halogen solvents such as chloroform, methylene chloride, trichloroethylene, ethylene dichloride, perchloroethylene, monochloroethane, dichloroethane, tetrachloroethane, perchloroethane, and chlorobenzene, ketone solvents such as acetone, methyl ethyl ketone, diethyl ketone, and acetophenone, urea solution, gasoline, kerosene, diesel gasoline, alcohol-containing gasoline, oxygen-containing gasoline, amine-containing gasoline, sour gasoline, castor oil-based brake fluid, glycol ether-based brake fluid, borate-based brake fluid, brake fluid for cold climate, silicone oil-based brake fluid, mineral oil-based brake fluid, power steering oil, hydrogen sulfide-containing oil, engine cooling fluid, window washer liquid, a medicinal agent, ink, and coating material. Further, in the present invention, the liquid chemicals of the present invention also include an aqueous solution containing the illustrated liquid chemicals described above as a component.

The multilayered tube for transporting liquid chemicals of the present invention is particularly suitable as fuel piping and can be particularly suitably used as automotive fuel piping. Examples of the automotive fuel piping include a fuel filler tube, a fuel delivery pipe, a fuel filler neck, and a quick connector.

EXAMPLES

Hereinafter, the present invention will be described in more detail by way of Examples and Comparative Example, but the present invention is not limited to Examples to be described below.

Note that each evaluation in Examples and Comparative Example was performed in accordance with the methods shown below.

(Measurement of the Number of Agglomerates in Resin Composition)

The number of agglomerates in a resin composition was measured by observing the cross section of the pellets of the resin composition in a range of about 9 mm². Then, the number of agglomerates each having a longitudinal width of 5 µm or more which are present in the observation area was determined, and the number of agglomerates per 1 mm² of cross-sectional area was determined.

(Measurement of the Number of Projections on the Surface of Innermost Layer and the Number of Agglomerates in the Cross Section of Innermost Layer)

Tubes each having an inner diameter of 6 mm and an outer diameter of 8 mm prepared in Examples and Comparative Example were used for the measurement of projections on the surface of the innermost layer and agglomerates in the cross section thereof.

The size of the projections on the surface of the innermost layer was determined by observing, with an optical microscope, the surface of the innermost layer of a tube fragment having a length of about 15 mm obtained by cutting the tube to ¼ in the longitudinal direction and measuring the size of the projections which are present in the range of 2 mm to right and left in the longitudinal direction from near the center of the fragment and a width of 1 mm (total 4 mm×1 mm). The height of the projections was measured by observing the surface of the innermost layer using a non-contact three-dimensional shape measuring instrument manufactured by Mitaka Kohki Co., Ltd. Then, the number of projections each having a height of 5 µm or more and a longitudinal width of 20 µm or more which are present in the observation area was determined to obtain the number of projections per 1 mm² of cross-sectional area.

The size of the agglomerates in the cross section of the innermost layer was determined by cutting the tube in the diameter direction, observing, with an optical microscope, the whole circumference of the cross section of the innermost layer, and measuring the size of the agglomerates which are present in the cross section. Then, the number of agglomerates each having a longitudinal width of 5 µm or more which are present in the observation area was determined to obtain the number of agglomerates per 1 mm² of cross-sectional area.

(Conductivity)

The conductivity was evaluated by measuring the surface resistivity of the innermost layer of the tubes prepared in Examples and Comparative Example by the method described in "7.9 Conductive Tubing" of SAE J2260.

(Impact Resistance)

A test piece was prepared by molding a resin composition for forming the innermost layer using an injection molding machine manufactured by Toshiba Machine Co., Ltd. (clamping force: 80 tons, screw diameter: ϕ32 mm) under conditions of a cylinder temperature of 320° C. and a mold temperature of 150° C. and using a T-runner mold or a double T-runner mold. The impact resistance was evaluated by measuring a Charpy notched impact strength at 23° C. using a Charpy impact testing machine (manufactured by Toyo Seiki Seisaku-sho, Ltd.) in accordance with ISO 179.

(Elongation Properties)

The elongation properties were evaluated by measuring the tensile elongation of the tubes prepared in Examples and Comparative Example by the method described in "7.15 Tensile Strength, Elongation" of SAE J2260.

(Liquid Chemical Barrier Properties)

A film having a width of 100 mm and a thickness of 150 µm was prepared using a resin composition for forming the innermost layer, and the film was measured for the permeability coefficient of liquid chemicals under an atmosphere of 40° C. and 65 RH % using a liquid permeability measuring device (manufactured by GTR Tec Corporation). Simulated fuel of isooctane/ethanol/toluene=45/10/45 (volume ratio) was used as the liquid chemical. A permeability coefficient of less than 5 g·mmg/mm²·atm·day was rated as "A"; a permeability coefficient of 5 to 10 g·mmg/mm²·atm·day was rated as "B"; and a permeability coefficient of more than 10 g·mmg/mm²·atm·day was rated as "C".

Example 1 (Production of Multilayered Tube for Transporting Liquid Chemicals)

<Preparation of Resin Composition for forming Innermost Layer>

A polyamide in which the dicarboxylic acid unit is a terephthalic acid unit and the diamine unit is a 1,9-nonanediamine unit and a 2-methyl-1,8-octanediamine unit (molar ratio: 50/50) was used as the polyamide (A); and a modified polymer "Tafmer" (manufactured by Mitsui Chemicals, Inc.) obtained by modifying an ethylene-butene copolymer with maleic anhydride was used as the impact modifier (B).

[Step (1A)]

The polyamide (A), the carbon nanotube (C), ethylene-bis-stearylamide which is a lubricant, and a phenolic antioxidant were mixed in proportions shown in Table 1. Further, 10 parts by mass of ethanol was mixed therewith as a solvent, and these components were mixed and dispersed for 10 minutes at 25° C. using a mixer to obtain a resin mixture.

[Step (1B)]

The solvent was removed from a vent at a processing temperature of 320° C. while kneading the above resin mixture using a twin screw extruder. A resin composition for forming the innermost layer was prepared by adding the impact modifier (B) from the middle of the extruder while removing the solvent, followed by further kneading and pelletizing.

A three-layer structure tube having an inner diameter of 6 mm and an outer diameter of 8 mm was prepared by using the resin composition obtained as described above and a material constituting each layer shown in Table 1 and molding them under a condition of a cylinder temperature of 330° C. by a tube molding machine manufactured by Maillefer S.A. The layer constitution of the tube and the thickness of each layer are as shown in Table 1.

Various evaluations were performed by the methods described above using the prepared tubes and test pieces for evaluating various physical properties prepared using the resin compositions for forming the innermost layer. The results are shown in Table 1.

Example 2

A multilayered tube for transporting liquid chemicals was prepared in the same manner as in Example 1 except that the amount of the carbon nanotube (C) blended in the resin composition for forming the innermost layer was changed as described in Table 1, and various evaluations were performed. The results are shown in Table 1.

Comparative Example 1

A resin composition for forming the innermost layer was prepared, without performing the step (1A) and the step (1B) of Example 1, by collectively mixing each component contained in the resin composition for forming the innermost layer shown in Table 1 and kneading the mixture at a temperature of 320° C. using a twin screw extruder, followed by pelletizing. A multilayered tube for transporting liquid chemicals was prepared in the same manner as in Example 1 using the resin composition, and various evaluations were performed. The results are shown in Table 1.

Impact Modifier (B)

"Tafmer", manufactured by Mitsui Chemicals, Inc., a modified polymer obtained by modifying an ethylene-butene copolymer with maleic anhydride Carbon Nanotube (C)

A carbon nanotube having a diameter of 1 nm and an aspect ratio of 100

Lubricant

Ethylene-bis-stearylamide

Antioxidant

Phenolic antioxidant

Intermediate Layer Material

N1001D-U83/02: "GENESTAR N1001D-U83/02", manufactured by Kuraray Co., Ltd., polyamide 9T (a polyamide in which the dicarboxylic acid unit is a terephthalic acid unit, and the diamine unit is a 1,9-nonanediamine unit and a 2-methyl-1,8-octanediamine unit (molar ratio: 50/50))

Outermost Layer Material

PA12: Polyamide 12 (polydodecanamide)

Table 1 shows that the multilayered tube for transporting liquid chemicals of the present invention is excellent in conductivity, impact resistance, liquid chemical barrier properties, and elongation properties.

Figure 2:
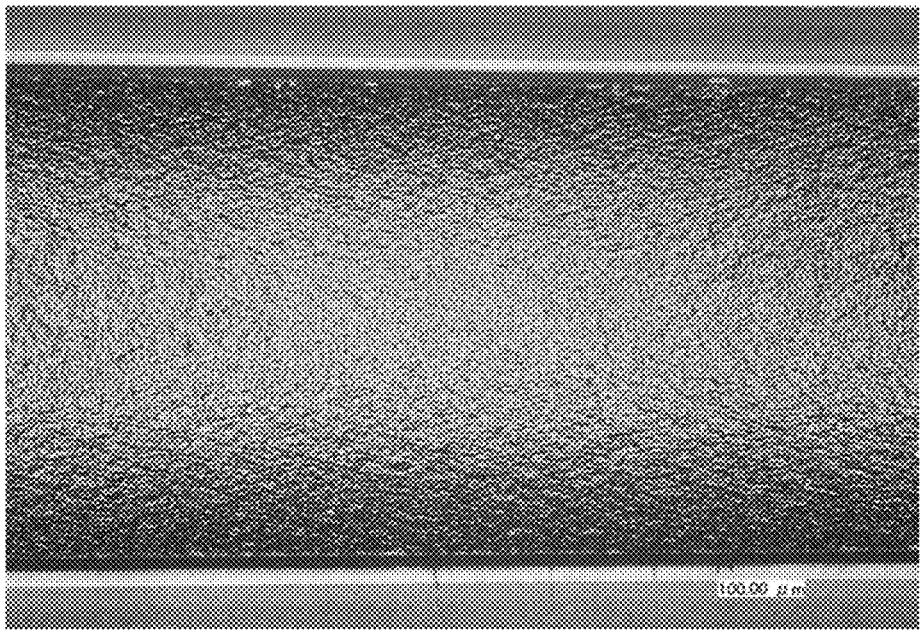
FIG. 2 is an optical microscope photograph of the surface and the cross section of the innermost layer of the multilayered tube for transporting liquid chemicals in Example 1.
Figure 2:
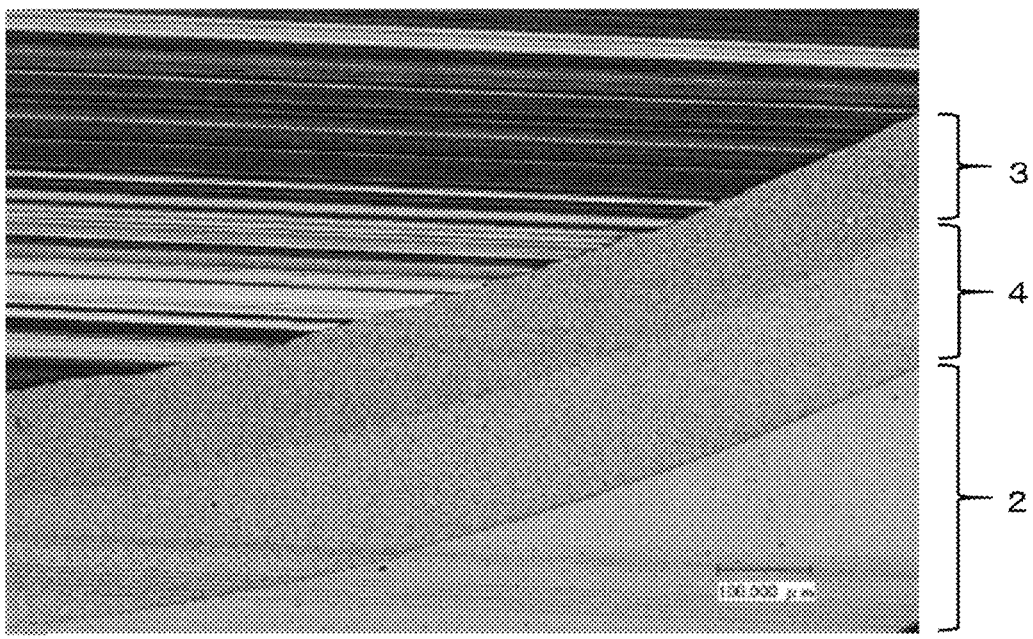
Figure 3:
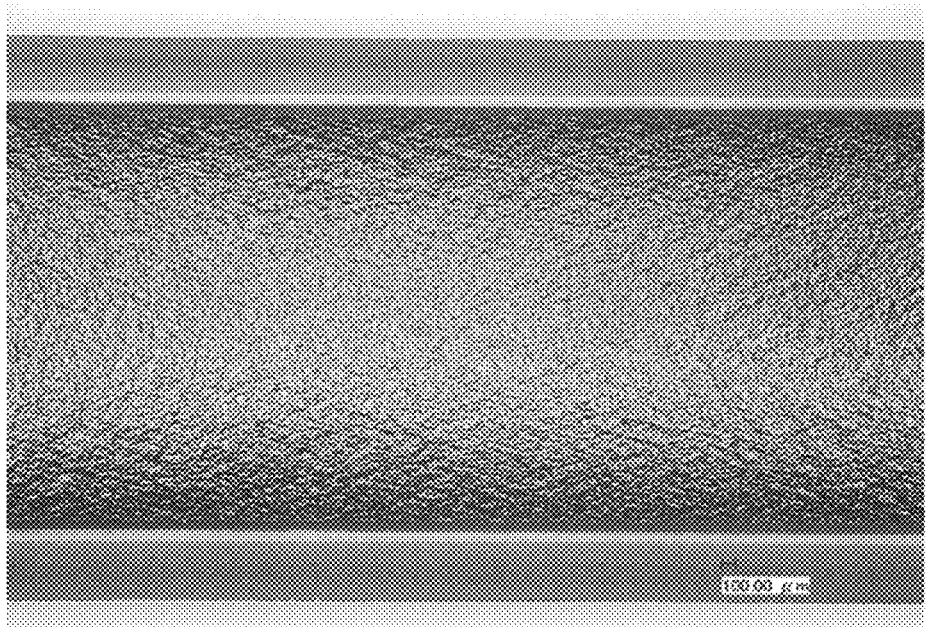
FIG. 3 is an optical microscope photograph of the surface and the cross section of the innermost layer of the multilayered tube for transporting liquid chemicals in Example 2.
Figure 3:
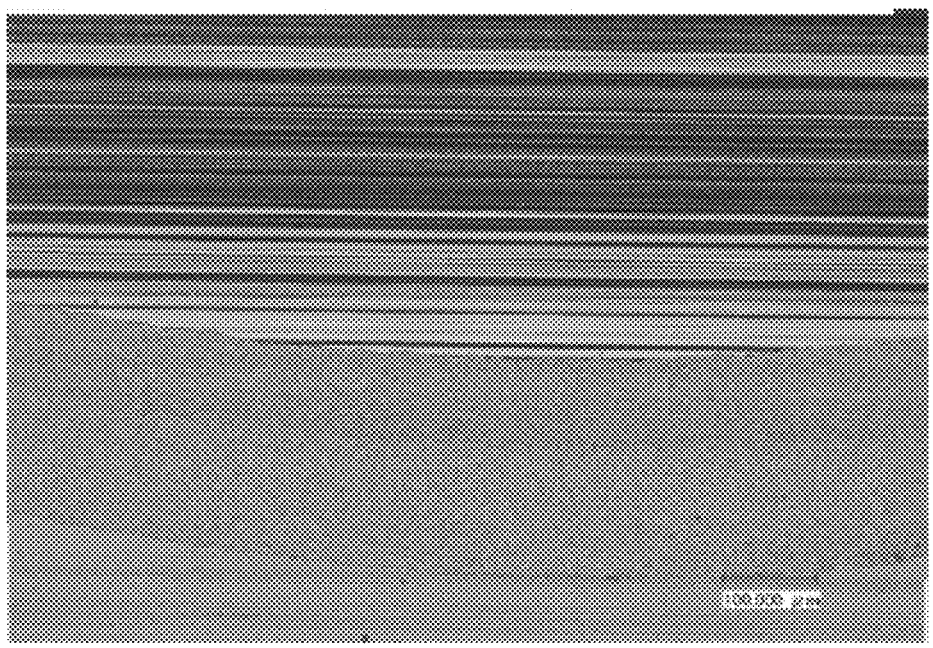
Figure 4:
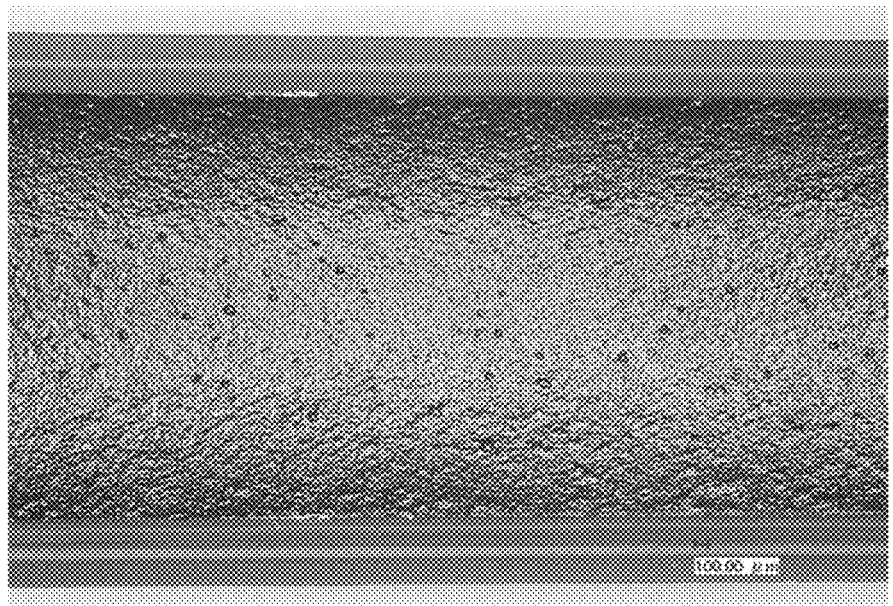
FIG. 4 is an optical microscope photograph of the surface and the cross section of the innermost layer of the multilayered tube for transporting liquid chemicals in Comparative Example 1.
Figure 4:
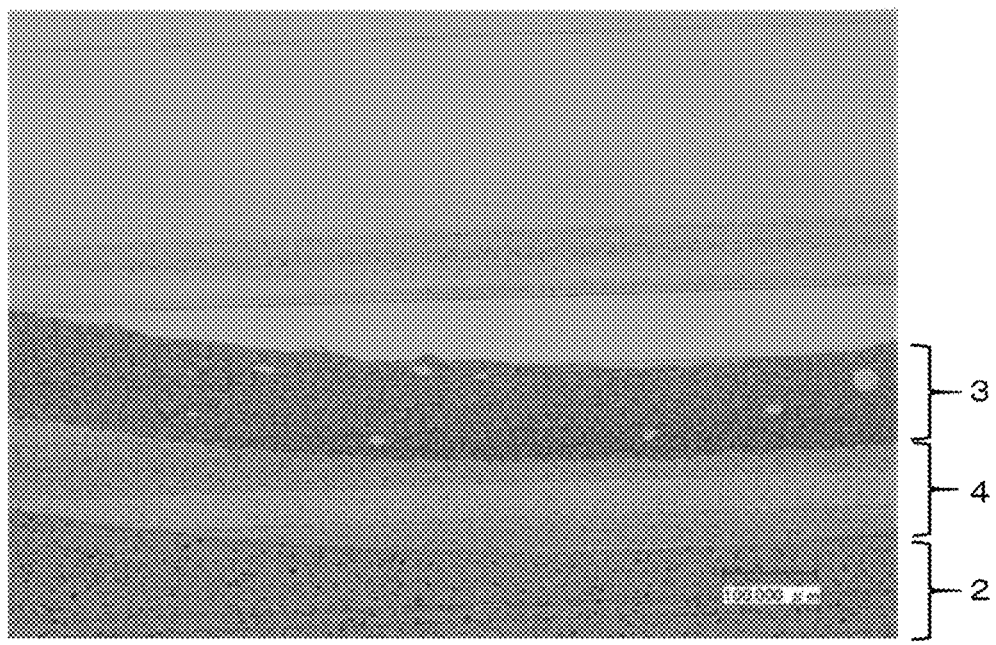

Further, FIGS. 2 to 4 are optical microscope photographs of the surface and the cross section of the innermost layer of the multilayered tube for transporting liquid chemicals in Example 1, Example 2, and Comparative Example 1, respectively. In FIGS. 2 to 4, reference character (a) denotes the optical microscope photographs of the surface of the innermost layer, and reference character (b) denotes the optical microscope photographs of the cross section of the multilayered tubes; and, in reference character (b), the innermost layer, the intermediate layer, and the outermost

TABLE 1

|  |  |  | Example 1 | Example 2 | Comparative Example 1 |
|---|---|---|---|---|---|
| Innermost layer | Polyamide (A) | (parts by mass) | 85 | 85 | 85 |
|  | Impact modifier (B) | (parts by mass) | 15 | 15 | 15 |
|  | Carbon nanotube (C) | (parts by mass) | 5 | 2.5 | 5 |
|  | Lubricant | (parts by mass) | 0.2 | 0.2 | 0.2 |
|  | Antioxidant | (parts by mass) | 0.5 | 0.5 | 0.5 |
|  | Steps (1A) and (1B) |  | performed | performed | not performed |
|  | Agglomerates in resin composition (/mm$^2$) |  | 7 | 3 | 34 |
|  | Thickness (mm) |  | 0.10 | 0.10 | 0.10 |
|  | Projections on the surface of innermost layer (/mm2) |  | 0.6 | 0.4 | 5.7 |
|  | Agglomerates in the cross section of innermost layer (/mm$^2$) |  | 11.5 | 9.4 | 62.6 |
| Intermediate layer | Material |  | N1001D-U83/02 | N1001D-U83/02 | N1001D-U83/02 |
|  | Thickness (mm) |  | 0.15 | 0.15 | 0.15 |
| Outermost layer | Material |  | PA12 | PA12 | PA12 |
|  | Thickness (mm) |  | 0.75 | 0.75 | 0.75 |
| Evaluation results | Surface resistivity of innermost layer ($\Omega$/□) |  | $3 \times 10^3$ | $2 \times 10^5$ | $1 \times 10^3$ |
|  | Charpy impact strength (J/m$^2$) |  | 95 | 110 | 50 |
|  | Tensile elongation (%) |  | 170 | 185 | 110 |
|  | Liquid chemical barrier properties |  | A | A | A |

Note that each component shown in Table 1 is as follows.

Polyamide (A)

"GENESTAR GC98010", manufactured by Kuraray Co., Ltd., polyamide 9T (a polyamide in which the dicarboxylic acid unit is a terephthalic acid unit, and the diamine unit is a 1,9-nonanediamine unit and a 2-methyl-1,8-octanediamine unit (molar ratio: 50/50))

layer are laminated in this order from the top. In the multilayered tubes of FIGS. 2 and 3, it is found that the projections on the surface of the innermost layer and the agglomerates in the cross section are almost not observed. On the other hand, in the multilayered tube of FIG. 4, many projections and agglomerates are observed on the surface and in the cross section of the innermost layer.

INDUSTRIAL APPLICABILITY

The present invention can provide a multilayered tube for transporting liquid chemicals which is excellent in conductivity, liquid chemical barrier properties, and impact resistance, hardly generates a crack also when inserted into other members, and is excellent in elongation properties; and a polyamide resin composition constituting the innermost layer of the multilayered tube for transporting liquid chemicals. The multilayered tube for transporting liquid chemicals is particularly suitable as fuel piping for motor vehicles and the like.

REFERENCE SIGNS LIST

1 Multilayered tube for transporting liquid chemicals
2 Outermost layer
3 Innermost layer
3a Surface of innermost layer
4 Intermediate layer

The invention claimed is:

1. A multilayered tube, comprising an outermost layer and an innermost layer, the innermost layer comprising a polyamide (A), an impact modifier (B), and a carbon nanotube (C), wherein
a number of projections each having a height of 5 μm or more and a longitudinal width of 20 μm or more, which are present on a surface of the innermost layer, is 2 or less per 1 mm$^2$ of surface area;
a number of agglomerates each having a longitudinal width of 5 μm or more, which are present in a cross section of the innermost layer, is 15 or less per 1 mm$^2$ of cross-sectional area;
the impact modifier (B) is a polymer obtained by modifying at least one polymer with an unsaturated compound having a carboxyl group and/or an acid anhydride group, the at least one polymer being selected from the group consisting of an α-olefin copolymer, an (ethylene and/or propylene)/(α,β-unsaturated carboxylic acid and/or unsaturated carboxylate) copolymer, an ionomer, and an aromatic vinyl compound/conjugated diene compound-based block copolymer,
a Charpy impact strength of a resin composition employed to form the innermost layer is 95 J/m$^2$ or more as measured at 23° C. in accordance with ISO 179;
a tensile elongation of the multilayered tube is 170% or more as measured in accordance with SAE J2260; and
the multilayered tube is prepared by a process comprising:
mixing and dispersing the polyamide (A) and the carbon nanotube (C) with a solvent to obtain a resin mixture, and
removing the solvent while kneading the resin mixture and then adding the impact modifier (B) thereto followed by kneading.

2. The multilayered tube according to claim 1, wherein the polyamide (A) comprises a dicarboxylic acid unit and a diamine unit, the dicarboxylic acid unit comprising 50 to 100 mol % of a terephthalic acid unit and/or a naphthalene dicarboxylic acid unit, and the diamine unit comprising 60 to 100 mol % of an aliphatic diamine unit having 4 to 18 carbon atoms.

3. The multilayered tube according to claim 1, wherein the at least one polymer comprises an α-olefin copolymer.

4. The multilayered tube according to claim 1, wherein the carbon nanotube (C) has a diameter of 0.5 to 100 nm and an aspect ratio of 5 or more.

5. The multilayered tube according to claim 1, wherein the innermost layer comprises 40 to 96.5 parts by mass of the polyamide (A), 3 to 30 parts by mass of the impact modifier (B), and 0.5 to 30 parts by mass of the carbon nanotube (C), based on 100 parts by mass of a total of the polyamide (A), the impact modifier (B), and the carbon nanotube (C).

6. The multilayered tube according to claim 1, wherein the outermost layer comprises at least one material selected from the group consisting of a polyolefin resin and a polyamide resin.

7. The multilayered tube according to claim 1, wherein the multilayered tube comprises an intermediate layer between the outermost layer and the innermost layer, and the intermediate layer is an intermediate barrier layer comprising at least one material selected from the group consisting of a saponified ethylene-vinyl acetate copolymer, a fluororesin, a semi-aromatic polyamide, and an aliphatic polyamide.

8. A polyamide resin composition comprising a polyamide (A), an impact modifier (B), and a carbon nanotube (C), wherein the polyamide resin composition is suitable as the innermost layer of the multilayered tube according to claim 1, and a number of agglomerates each having a longitudinal width of 5 μm or more is 10 or less per 1 mm$^2$.

9. The multilayered tube according to claim 1, wherein the impact modifier (B) has a flexural modulus of 500 MPa or less as measured in accordance with ASTM D 790.

10. The multilayered tube according to claim 1, wherein the at least one polymer comprises a copolymer of ethylene and an α-olefin having 3 or more carbon atoms.

11. The multilayered tube according to claim 1, wherein the at least one polymer comprises an ethylene-butene copolymer.

12. The multilayered tube according to claim 3, wherein the at least one polymer is selected from the group consisting of an (ethylene and/or propylene)/(α,β-unsaturated carboxylic acid and/or unsaturated carboxylate) copolymer, an ionomer, and an aromatic vinyl compound/conjugated diene compound-based block copolymer.

13. The multilayered tube according to claim 1, wherein the at least one polymer comprises an (ethylene and/or propylene)/(α,β-unsaturated carboxylic acid and/or unsaturated carboxylate) copolymer.

14. The multilayered tube according to claim 1, wherein the at least one polymer comprises an ionomer.

15. The multilayered tube according to claim 1, wherein the at least one polymer comprises an aromatic vinyl compound/conjugated diene compound-based block copolymer.

16. The multilayered tube according to claim 1, further comprising:
a dispersing aid.

17. The multilayered tube according to claim 16, wherein the dispersing aid is polyethylene oxide.

18. The multilayered tube according to claim 1, wherein the number of projections is 0.6 or less per 1 mm$^2$ of surface area; and
the number of agglomerates is 11.5 or less per 1 mm$^2$ of cross-sectional area.

19. The multilayered tube according to claim 1, wherein the number of projections is 0.4 or less per 1 mm$^2$ of surface area; and
the number of agglomerates is 9.4 or less per 1 mm$^2$ of cross-sectional area.

20. The multilayered tube according to claim 1, wherein the Charpy impact strength of the resin composition employed to form the innermost layer is 95 J/m$^2$ or more and 110 J/m$^2$ or less as measured at 23° C. in accordance with ISO 179; and the tensile elongation of the multilayered tube is 170% or more and 185% or less as measured in accordance with SAE J2260.

\* \* \* \* \*